(12) United States Patent
Heo et al.

(10) Patent No.: US 11,716,461 B2
(45) Date of Patent: Aug. 1, 2023

(54) IMAGE CODING METHOD AND DEVICE FOR CARRYING OUT MRL-BASED INTRA PREDICTION

(71) Applicant: LG Electronics Inc., Seoul (KR)

(72) Inventors: Jin Heo, Seoul (KR); Sunmi Yoo, Seoul (KR); Ling Li, Seoul (KR); Jangwon Choi, Seoul (KR); Jungah Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/374,274

(22) Filed: Jul. 13, 2021

(65) Prior Publication Data
US 2021/0344907 A1 Nov. 4, 2021

Related U.S. Application Data

(63) Continuation of application No. PCT/KR2020/000570, filed on Jan. 13, 2020.
(Continued)

(51) Int. Cl.
*H04N 19/105* (2014.01)
*H04N 19/159* (2014.01)
*H04N 19/176* (2014.01)

(52) U.S. Cl.
CPC ......... *H04N 19/105* (2014.11); *H04N 19/159* (2014.11); *H04N 19/176* (2014.11)

(58) Field of Classification Search
None
See application file for complete search history.

(56) References Cited

U.S. PATENT DOCUMENTS

| 10,419,754 | B1 * | 9/2019 | Zhao | H04N 19/11 |
| 11,044,470 | B2 * | 6/2021 | Kim | H04N 19/46 |

(Continued)

FOREIGN PATENT DOCUMENTS

| JP | 2020-503815 | 1/2020 |
| JP | 2020-508617 | 3/2020 |

(Continued)

OTHER PUBLICATIONS

Chen et al., "Algorithm description for Versatile Video Coding and Test Model 3 (VTM 3)," JVET-L1002-v1, Joint Video Experts Team (JVET) of ITU-T SG 16 WP 3 and ISO/IEC JTC I/SC 29/WG 11, 12th Meeting: Macao, CN, Oct. 3-12, 2018, 37 pages.

(Continued)

*Primary Examiner* — Lindsay J Uhl
(74) *Attorney, Agent, or Firm* — Fish & Richardson P.C.

(57) ABSTRACT

An image decoding method includes: configuring a MPM list including candidate intra prediction modes for a current block; deriving an intra prediction mode of the current block from the MPM list on the basis of MPM index information indicating an intra prediction mode, among the candidate intra prediction modes included in the MPM list, for the current block; generating prediction samples for the current block on the basis of the intra prediction mode; and generating a reconstructed picture for the current block on the basis of the prediction samples, wherein the step for configuring the MPM list comprises, on the basis of the case where the value of reference line index information, representing a reference line used for the intra prediction of the current block, is not zero, deriving a DC mode as one mode among the candidate intra prediction modes, and including same in the MPM list.

12 Claims, 16 Drawing Sheets

Related U.S. Application Data

(60) Provisional application No. 62/791,877, filed on Jan. 13, 2019.

(56) References Cited

U.S. PATENT DOCUMENTS

| | | | | |
|---|---|---|---|---|
| 2014/0119439 | A1* | 5/2014 | Guo | H04N 19/70 375/240.12 |
| 2018/0332284 | A1 | 11/2018 | Liu et al. | |
| 2019/0238835 | A1* | 8/2019 | Lee | H04N 19/176 |
| 2020/0296417 | A1* | 9/2020 | Ko | H04N 19/463 |
| 2020/0413069 | A1* | 12/2020 | Lim | H04N 19/593 |
| 2021/0029352 | A1* | 1/2021 | Zhang | H04N 19/96 |
| 2021/0176493 | A1* | 6/2021 | Wang | H04N 19/176 |

FOREIGN PATENT DOCUMENTS

| | | |
|---|---|---|
| JP | 2020-533822 | 11/2020 |
| KR | 10-2018-0015598 | 2/2018 |
| KR | 10-2018-0123674 | 11/2018 |
| KR | 10-2018-0136967 | 12/2018 |
| WO | WO2017190288 | 11/2017 |
| WO | WO 2018/132475 | 7/2018 |
| WO | WO 2019/009540 | 1/2019 |
| WO | WO2019194950 | 10/2019 |

OTHER PUBLICATIONS

Li et al., "CE3-6.2.1: Extended MPM list," JVET-L0165-v1, Presented at Joint Video Experts Team (JVET) of ITU-T SG 16 WP 3 and 1S0/IEC JTC 1/SC 29/WG 11, 12th Meeting: Macao, CN, Oct. 3-12, 2018, 6 pages.

Partial Supplementary European Search Report in European Appln. No. 20738225.0, dated Feb. 14, 2022, 15 pages.

Tian et al., "Adaptive intra mode decision for HEVC based on texture characteristics and multiple reference lines," Multimedia Tools and Applications, Jan. 2019, 78(1):289-310.

Extended European Search Report in European Application No. 20738225.0, dated May 23, 2022, 19 pages.

Filippov et al., "CE3-related: Alternative techniques for DC mode without division," Joint Video Experts Team (JVET) of ITU-T SG 16 WP 3 and ISO/IEC JTC 1/SC 29/WG 11, Document: JVET-K0122-v1, 11th Meeting: Ljubljana, SI, Jul. 10-18, 2018, 6 pages.

Kim et al., "[CE3-related: DC mode with only shift operators based on sub-sampling]," Joint Video Experts Team (JVET) of ITU-T SG 16 WP 3 and ISO/IEC JTC 1/SC 29/WG 11, Document: JVET-K0400-v3, 11th Meeting: Ljubljana, SI, Jul. 10-18, 2018, 4 pages.

Office Action in Japanese Appln. No. 2021-540554, dated Nov. 1, 2022, 5 pages (with English translation).

* cited by examiner

FIG. 12

(a) 4x4 Block
dcVal = avg(A, B, C, D, E, F, G, H)

(b) 8x4 Block
dcVal = avg(A, B, C, D, E, F, G, H)

FIG. 13

(a) Method 1
dcVal = avg(A, C, E, G, I, J, K, L)

(b) Method 2
dcVal = avg(B, D, F, H, I, J, K, L)

(c) Method 3
dcVal = avg(A, B, C, D, I, J, K, L)

(d) Method 4
dcVal = avg(E, F, G, H, I, J, K, L)

IMAGE CODING METHOD AND DEVICE FOR CARRYING OUT MRL-BASED INTRA PREDICTION

CROSS-REFERENCE TO RELATED APPLICATIONS

Pursuant to 35 U.S.C. § 119(e), this application is a continuation of International Application PCT/KR2020/000570 with an international filing date of Jan. 13, 2020, which claims the benefit of U.S. Provisional Patent Application No. 62/791,877, filed on Jan. 13, 2019, the contents of which are hereby incorporated by reference herein in their entirety.

BACKGROUND OF THE DISCLOSURE

Field of the Disclosure

The present disclosure relates to image coding technology and, more particularly, to a method and apparatus for performing Multi-Reference Line (MRL)-based intra prediction.

Related Art

Recently, the demand for high resolution, high quality image/video such as 4K, 8K or more Ultra High Definition (UHD) image/video is increasing in various fields. As the image/video resolution or quality becomes higher, relatively more amount of information or bits are transmitted than for conventional image/video data. Therefore, if image/video data are transmitted via a medium such as an existing wired/wireless broadband line or stored in a legacy storage medium, costs for transmission and storage are readily increased.

Moreover, interests and demand are growing for virtual reality (VR) and artificial reality (AR) contents, and immersive media such as hologram; and broadcasting of images/videos exhibiting image/video characteristics different from those of an actual image/video, such as game images/videos, are also growing.

Therefore, a highly efficient image/video compression technique is required to effectively compress and transmit, store, or play high resolution, high quality images/videos showing various characteristics as described above.

SUMMARY

A technical object of the present disclosure is to provide a method and apparatus for improving image coding efficiency.

Another technical object of the present disclosure is to provide an efficient intra prediction method and apparatus.

Yet another technical object of the present disclosure is to provide a method and apparatus for applying a DC mode to Multi-Reference Line (MRL)-based intra prediction and constructing a Most Probable Mode (MPM) list including the DC mode.

According to one embodiment of the present disclosure, an image decoding method performed by a decoding apparatus is provided. The method comprises constructing a Most Probable Mode (MPM) list including candidate intra prediction modes for a current block; deriving an intra prediction mode of the current block from the MPM list based on MPM index information indicating an intra prediction mode for the current block among the candidate intra prediction modes included in the MPM list; generating prediction samples for the current block based on the intra prediction mode; and generating a reconstructed picture for the current block based on the prediction samples, wherein the constructing of the MPM list includes deriving a DC mode as one of the candidate intra prediction modes to include the DC mode in the MPM list, based on a case in which a value of reference line index information indicating a reference line used for intra prediction of the current block is not equal to 0.

According to another embodiment of the present disclosure, an image encoding method performed by an encoding apparatus is provided. The method comprises constructing a Most Probable Mode (MPM) list including candidate intra prediction modes for a current block; deriving an intra prediction mode of the current block based on the candidate intra prediction modes included in the MPM list; generating MPM index information indicating an intra prediction mode of the current block among the candidate intra prediction modes included in the MPM list; and encoding image information including at least one of reference line index information indicating a reference line used for intra prediction of the current block or the MPM index information, wherein the constructing of the MPM list includes deriving a DC mode as one of the candidate intra prediction modes to include the DC mode in the MPM list, based on a case in which a value of the reference line index information is not equal to 0.

According to yet another embodiment of the present disclosure, a computer-readable digital storage medium storing encoded image information is provided, which causes the image decoding method disclosed in claim 1 to be performed.

Advantageous Effects

According to the present disclosure, the overall image/video compression efficiency may be improved.

According to the present disclosure, computational complexity may be reduced and prediction performance may be improved through efficient intra prediction, and thereby, the overall coding efficiency may be improved.

According to the present disclosure, by constructing an MPM list including an DC mode for MRL-based intra prediction and performing DC mode intra prediction using MRLs, prediction accuracy may be enhanced, through which the overall coding efficiency may be improved.

BRIEF DESCRIPTION OF THE DRAWINGS

FIG. 12 illustrates one embodiment of a method for deriving prediction samples in a DC mode.

FIG. 13 illustrates another embodiment of a method for deriving prediction samples in a DC mode.

DESCRIPTION OF EXEMPLARY EMBODIMENTS

Figure 1:
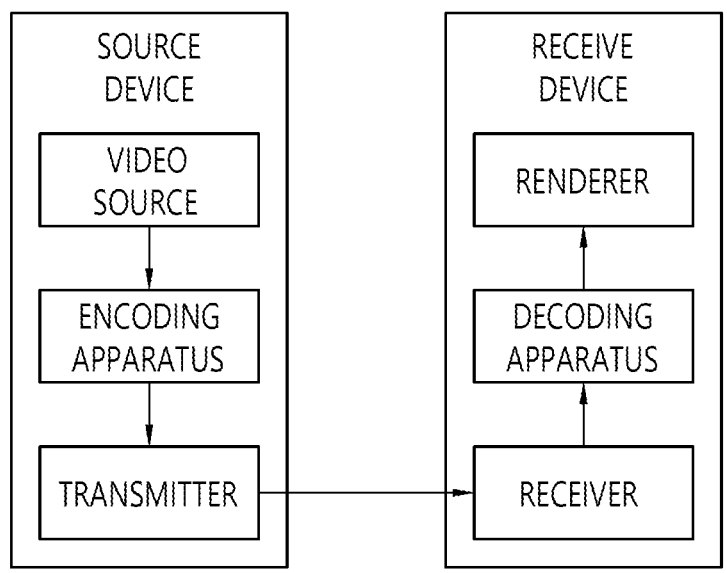
FIG. 1 illustrates an example of a video/image coding system to which the embodiments of the present document may be applied.

An exemplary embodiment of the present disclosure provides an image information decoding method performed by a decoding apparatus. The method includes: decoding a non-separable secondary transform (NSST) index from a bitstream, if an NSST is applied to a target block, decoding information about transform coefficients for the target block from the bitstream, based on the decoded NSST index, and deriving the transform coefficients for the target block based on the decoded information about the transform coefficients, in which the NSST index is decoded prior to the information about the transform coefficients for the target block.

The present disclosure may be modified in various forms, and specific embodiments thereof will be described and illustrated in the drawings. However, the embodiments are not intended for limiting the disclosure. The terms used in the following description are used to merely describe specific embodiments, but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Hereinafter, examples of the present embodiment will be described in detail with reference to the accompanying drawings. In addition, like reference numerals are used to indicate like elements throughout the drawings, and the same descriptions on the like elements will be omitted.

This document relates to video/image coding. For example, a method/embodiment disclosed in this document may be applied to a method disclosed in the versatile video coding (VVC) standard, the essential video coding (EVC) standard, the AOMedia Video 1 (AV1) standard, the 2nd generation of audio video coding standard (AVS2) or the next generation video/image coding standard (e.g., H.267, H.268, or the like).

This document suggests various embodiments of video/image coding, and the above embodiments may also be performed in combination with each other unless otherwise specified.

In this document, a video may refer to a series of images over time. A picture generally refers to the unit representing one image at a particular time frame, and a slice/tile refers to the unit constituting a part of the picture in terms of coding. A slice/tile may include one or more coding tree units (CTUs). One picture may consist of one or more slices/tiles. One picture may consist of one or more tile groups. One tile group may include one or more tiles. A brick may represent a rectangular region of CTU rows within a tile in a picture (a brick may represent a rectangular region of CTU rows within a tile in a picture). A tile may be partitioned into a multiple bricks, each of which may be constructed with one or more CTU rows within the tile (A tile may be partitioned into multiple bricks, each of which consisting of one or more CTU rows within the tile). A tile that is not partitioned into multiple bricks may also be referred to as a brick. A brick scan may represent a specific sequential ordering of CTUs partitioning a picture, wherein the CTUs may be ordered in a CTU raster scan within a brick, and bricks within a tile may be ordered consecutively in a raster scan of the bricks of the tile, and tiles in a picture may be ordered consecutively in a raster scan of the tiles of the picture (A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture). A tile is a particular tile column and a rectangular region of CTUs within a particular tile column (A tile is a rectangular region of CTUs within a particular tile column and a particular tile row in a picture). The tile column is a rectangular region of CTUs, which has a height equal to the height of the picture and a width that may be specified by syntax elements in the picture parameter set (The tile column is a rectangular region of CTUs having a height equal to the height of the picture and a width specified by syntax elements in the picture parameter set). The tile row is a rectangular region of CTUs, which has a width specified by syntax elements in the picture parameter set and a height that may be equal to the height of the picture (The tile row is a rectangular region of CTUs having a height specified by syntax elements in the picture parameter set and a width equal to the width of the picture). A tile scan may represent a specific sequential ordering of CTUs partitioning a picture, and the CTUs may be ordered consecutively in a CTU raster scan in a tile, and tiles in a picture may be ordered consecutively in a raster scan of the tiles of the picture (A tile scan is a specific sequential ordering of CTUs partitioning a picture in which the CTUs are ordered consecutively in CTU raster scan in a tile whereas tiles in a picture are ordered consecutively in a raster scan of the tiles of the picture). A slice may include an integer number of bricks of a picture, and the integer number of bricks may be included in a single NAL unit (A slice includes an integer number of bricks of a picture that may be exclusively contained in a single NAL unit). A slice may be constructed with multiple complete tiles, or may be a consecutive sequence of complete bricks of one tile (A slice may consists of either a number of complete tiles or only a consecutive sequence of complete bricks of one tile). In this document, a tile group and a slice may be used in place of each other. For example, in this document, a tile group/tile group header may be referred to as a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows. Alternatively, the sample may mean a pixel value in the spatial domain, and when such a pixel value is transformed to the frequency domain, it may mean a transform coefficient in the frequency domain.

In this document, the symbol"/" and "," should be interpreted as "and/or." For example, the expression "A/B" is interpreted as "A and/or B", and the expression "A, B" is interpreted as "A and/or B." Additionally, the expression "A/B/C" means "at least one of A, B, and/or C." Further, the expression "A, B, C" also means "at least one of A, B, and/or C." (In this document, the term "I" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C.")

Additionally, in the present document, the term "or" should be interpreted as "and/or." For example, the expression "A or B" may mean 1) only "A", 2) only "B", and/or 3) "both A and B." In other words, the term "or" in the present document may mean "additionally or alternatively." (Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively.")

FIG. 1 illustrates an example of a video/image coding system to which the embodiments of the present document may be applied.

Referring to FIG. 1, a video/image coding system may include a source device and a reception device. The source device may transmit encoded video/image information or data to the reception device through a digital storage medium or network in the form of a file or streaming.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compaction and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

Figure 2:
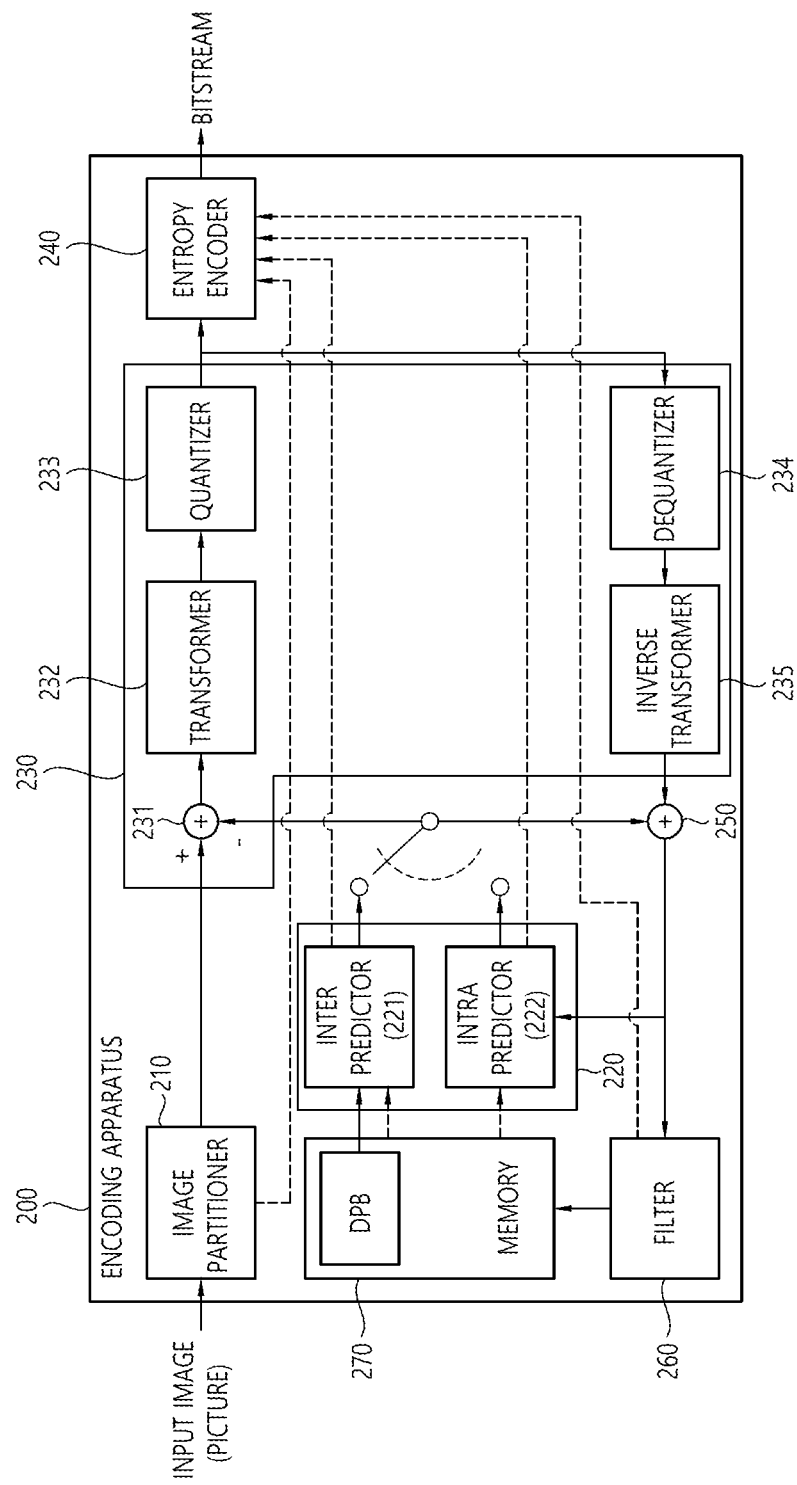
FIG. 2 is a diagram schematically illustrating a configuration of a video/image encoding apparatus to which the embodiments of the present document may be applied.

FIG. 2 is a diagram schematically illustrating a configuration of a video/image encoding apparatus to which the embodiments of the present document may be applied. Hereinafter, what is referred to as the video encoding apparatus may include an image encoding apparatus.

Referring to FIG. 2, the encoding apparatus 200 may include and be configured with an image partitioner 210, a predictor 220, a residual processor 230, an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or reconstructed block generator. The image partitioner 210, the predictor 220, the residual processor 230, the entropy encoder 240, the adder 250, and the filter 260, which have been described above, may be configured by one or more hardware components (e.g., encoder chipsets or processors) according to an embodiment. In addition, the memory 270 may include a decoded picture buffer (DPB), and may also be configured by a digital storage medium. The hardware component may further include the memory 270 as an internal/external component.

The image partitioner 210 may split an input image (or, picture, frame) input to the encoding apparatus 200 into one or more processing units. As an example, the processing unit may be called a coding unit (CU). In this case, the coding unit may be recursively split according to a Quad-tree binary-tree ternary-tree (QTBTTT) structure from a coding tree unit (CTU) or the largest coding unit (LCU). For example, one coding unit may be split into a plurality of coding units of a deeper depth based on a quad-tree structure, a binary-tree structure, and/or a ternary-tree structure. In this case, for example, the quad-tree structure is first applied and the binary-tree structure and/or the ternary-tree structure may be later applied. Alternatively, the binary-tree structure may also be first applied. A coding procedure according to the present disclosure may be performed based on a final coding unit which is not split any more. In this case, based on coding efficiency according to image characteristics or the like, the maximum coding unit may be directly used as the final coding unit, or as necessary, the coding unit may be recursively split into coding units of a deeper depth, such that a coding unit having an optimal size may be used as the final coding unit. Here, the coding procedure may include a procedure such as prediction, transform, and reconstruction to be described later. As another example, the processing unit may further include a prediction unit (PU) or a transform unit (TU). In this case, each of the prediction unit and the transform unit may be split or partitioned from the aforementioned final coding unit. The prediction unit may be a unit of sample prediction, and the transform unit may be a unit for inducing a transform coefficient and/or a unit for inducing a residual signal from the transform coefficient.

The unit may be interchangeably used with the term such as a block or an area in some cases. Generally, an M×N block may represent samples composed of M columns and N rows or a group of transform coefficients. The sample may generally represent a pixel or a value of the pixel, and may also represent only the pixel/pixel value of a luma component, and also represent only the pixel/pixel value of a chroma component. The sample may be used as the term corresponding to a pixel or a pel configuring one picture (or image).

The encoding apparatus 200 may generate a residual signal (residual block, residual sample array) by subtracting a predicted signal (predicted block, prediction sample array) output from the inter predictor 221 or the intra predictor 222 from the input image signal (original block, original sample array), and the generated residual signal is transmitted to the transformer 232. In this case, as illustrated, the unit for subtracting the predicted signal (predicted block, prediction sample array) from the input image signal (original block, original sample array) within an encoder 200 may be called the subtractor 231. The predictor may perform prediction for a block to be processed (hereinafter, referred to as a current block), and generate a predicted block including prediction samples of the current block. The predictor may determine whether intra prediction is applied or inter prediction is applied in units of the current block or the CU. The predictor may generate various information about prediction, such as prediction mode information, to transfer the generated information to the entropy encoder 240 as described later in the description of each prediction mode. The information about prediction may be encoded by the entropy encoder 240 to be output in a form of the bitstream.

The intra predictor 222 may predict a current block with reference to samples within a current picture. The referenced samples may be located neighboring to the current block, or may also be located away from the current block according to the prediction mode. The prediction modes in the intra prediction may include a plurality of non-directional modes and a plurality of directional modes. The non-directional mode may include, for example, a DC mode or a planar mode. The directional mode may include, for example, 33 directional prediction modes or 65 directional prediction modes according to the fine degree of the prediction direction. However, this is illustrative and the directional prediction modes which are more or less than the above number may be used according to the setting. The intra predictor 222 may also determine the prediction mode applied to the current block using the prediction mode applied to the neighboring block.

The inter predictor 221 may induce a predicted block of the current block based on a reference block (reference sample array) specified by a motion vector on a reference picture. At this time, in order to decrease the amount of motion information transmitted in the inter prediction mode, the motion information may be predicted in units of a block, a sub-block, or a sample based on the correlation of the motion information between the neighboring block and the current block. The motion information may include a motion vector and a reference picture index. The motion information may further include inter prediction direction (L0 prediction, L1 prediction, Bi prediction, or the like) information. In the case of the inter prediction, the neighboring block may include a spatial neighboring block existing within the current picture and a temporal neighboring block existing in the reference picture. The reference picture including the reference block and the reference picture including the temporal neighboring block may also be the same as each other, and may also be different from each other. The temporal neighboring block may be called the name such as a collocated reference block, a collocated CU (colCU), or the like, and the reference picture including the temporal neighboring block may also be called a collocated picture (colPic). For example, the inter predictor 221 may configure a motion information candidate list based on the neighboring blocks, and generate information indicating what candidate is used to derive the motion vector and/or the reference picture index of the current block. The inter prediction may be performed based on various prediction modes, and for example, in the case of a skip mode and a merge mode, the inter predictor 221 may use the motion information of the neighboring block as the motion information of the current block. In the case of the skip mode, the residual signal may not be transmitted unlike the merge mode. A motion vector prediction (MVP) mode may indicate the motion vector of the current block by using the motion vector of the neighboring block as a motion vector predictor, and signaling a motion vector difference.

The predictor 200 may generate a predicted signal based on various prediction methods to be described later. For example, the predictor may not only apply the intra prediction or the inter prediction for predicting one block, but also simultaneously apply the intra prediction and the inter prediction. This may be called a combined inter and intra prediction (CIIP). Further, the predictor may be based on an intra block copy (IBC) prediction mode, or a palette mode in order to perform prediction on a block. The IBC prediction mode or palette mode may be used for content image/video coding of a game or the like, such as screen content coding (SCC). The IBC basically performs prediction in a current picture, but it may be performed similarly to inter prediction in that it derives a reference block in a current picture. That is, the IBC may use at least one of inter prediction techniques described in the present document. The palette mode may be regarded as an example of intra coding or intra prediction. When the palette mode is applied, a sample value in a picture may be signaled based on information on a palette index and a palette table.

The predicted signal generated through the predictor (including the inter predictor 221 and/or the intra predictor 222) may be used to generate a reconstructed signal or used to generate a residual signal. The transformer 232 may generate transform coefficients by applying the transform technique to the residual signal. For example, the transform technique may include at least one of a discrete cosine transform (DCT), a discrete sine transform (DST), a Karhunen-Loève transform (KLT), a graph-based transform (GBT), or a conditionally non-linear transform (CNT). Here, when the relationship information between pixels is illustrated as a graph, the GBT means the transform obtained from the graph. The CNT means the transform which is acquired based on a predicted signal generated by using all previously reconstructed pixels. In addition, the transform process may also be applied to a pixel block having the same size of the square, and may also be applied to the block having a variable size rather than the square.

The quantizer 233 may quantize the transform coefficients to transmit the quantized transform coefficients to the entropy encoder 240, and the entropy encoder 240 may encode the quantized signal (information about the quantized transform coefficients) to the encoded quantized signal to the bitstream. The information about the quantized transform coefficients may be called residual information. The quantizer 233 may rearrange the quantized transform coefficients having a block form in a one-dimensional vector form based on a coefficient scan order, and also generate the information about the quantized transform coefficients based on the quantized transform coefficients of the one dimensional vector form. The entropy encoder 240 may perform various encoding methods, for example, such as an exponential Golomb coding, a context-adaptive variable length coding (CAVLC), and a context-adaptive binary arithmetic coding (CABAC). The entropy encoder 240 may also encode information (e.g., values of syntax elements and the like) necessary for reconstructing video/image other than the quantized transform coefficients together or separately. The encoded information (e.g., encoded video/image information) may be transmitted or stored in units of network abstraction layer (NAL) unit in a form of the bitstream. The video/image information may further include information about various parameter sets such as an adaptation parameter set (APS), a picture parameter set (PPS), a sequence parameter set (SPS), or a video parameter set (VPS). In addition, the video/image information may further include general constraint information. The signaled/transmitted information and/or syntax elements to be described later in this document may be encoded through the aforementioned encoding procedure and thus included in the bitstream. The bitstream may be transmitted through a network, or stored in a digital storage medium. Here, the network may include a broadcasting network and/or a communication network, or the like, and the digital storage medium may include various storage media such as USB, SD, CD, DVD, Blue-ray, HDD, and SSD. A transmitter (not illustrated) for transmitting the signal output from the entropy encoder 240 and/or a storage (not illustrated) for storing the signal may be configured as the internal/external elements of the encoding apparatus 200, or the transmitter may also be included in the entropy encoder 240.

The quantized transform coefficients output from the quantizer 233 may be used to generate a predicted signal. For example, the dequantizer 234 and the inverse transformer 235 apply dequantization and inverse transform to the quantized transform coefficients, such that the residual signal (residual block or residual samples) may be reconstructed. The adder 250 adds the reconstructed residual signal to the predicted signal output from the inter predictor 221 or the intra predictor 222, such that the reconstructed signal (reconstructed picture, reconstructed block, reconstructed sample array) may be generated. As in the case where the skip mode is applied, if there is no residual for the block to be processed, the predicted block may be used as the reconstructed block. The adder 250 may be called a reconstructor or a reconstructed block generator. The generated reconstructed signal may be used for the intra prediction of the next block to be processed within the current picture, and as described later, also used for the inter prediction of the next picture through filtering.

Meanwhile, a luma mapping with chroma scaling (LMCS) may also be applied in a picture encoding and/or reconstruction process.

The filter 260 may apply filtering to the reconstructed signal, thereby improving subjective/objective image qualities. For example, the filter 260 may apply various filtering methods to the reconstructed picture to generate a modified reconstructed picture, and store the modified reconstructed picture in the memory 270, specifically, the DPB of the memory 270. Various filtering methods may include, for example, a deblocking filtering, a sample adaptive offset, an adaptive loop filter, a bilateral filter, and the like. The filter 260 may generate various filtering-related information to transfer the generated information to the entropy encoder 240, as described later in the description of each filtering method. The filtering-related information may be encoded by the entropy encoder 240 to be output in a form of the bitstream.

The modified reconstructed picture transmitted to the memory 270 may be used as the reference picture in the inter predictor 221. If the inter prediction is applied by the inter predictor, the encoding apparatus may avoid the prediction mismatch between the encoding apparatus 200 and the decoding apparatus, and also improve coding efficiency.

The DPB of the memory 270 may store the modified reconstructed picture to be used as the reference picture in the inter predictor 221. The memory 270 may store motion information of the block in which the motion information within the current picture is derived (or encoded) and/or motion information of the blocks within the previously reconstructed picture. The stored motion information may be transferred to the inter predictor 221 to be utilized as motion information of the spatial neighboring block or motion information of the temporal neighboring block. The memory 270 may store the reconstructed samples of the reconstructed blocks within the current picture, and transfer the reconstructed samples to the intra predictor 222.

Figure 3:
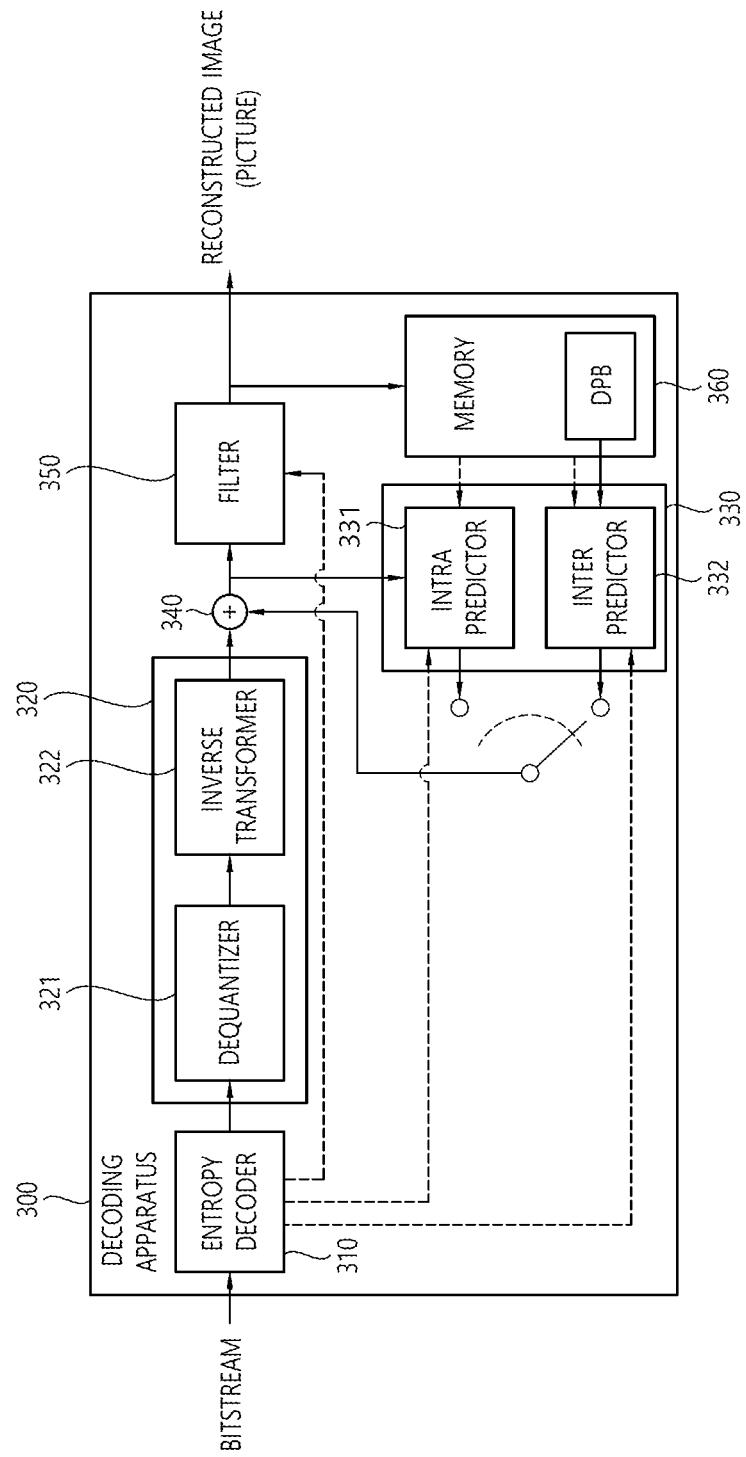
FIG. 3 is a diagram for schematically explaining a configuration of a video/image decoding apparatus to which the present disclosure is applicable.

FIG. 3 is a diagram for schematically explaining a configuration of a video/image decoding apparatus to which the present disclosure is applicable.

Referring to FIG. 3, the decoding apparatus 300 may include and configured with an entropy decoder 310, a residual processor 320, a predictor 330, an adder 340, a filter 350, and a memory 360. The predictor 330 may include an inter predictor 331 and an intra predictor 332. The residual processor 320 may include a dequantizer 321 and an inverse transformer 322. The entropy decoder 310, the residual processor 320, the predictor 330, the adder 340, and the filter 350, which have been described above, may be configured by one or more hardware components (e.g., decoder chipsets or processors) according to an embodiment. Further, the memory 360 may include a decoded picture buffer (DPB), and may be configured by a digital storage medium. The hardware component may further include the memory 360 as an internal/external component.

When the bitstream including the video/image information is input, the decoding apparatus 300 may reconstruct the image in response to a process in which the video/image information is processed in the encoding apparatus illustrated in FIG. 2. For example, the decoding apparatus 300 may derive the units/blocks based on block split-related information acquired from the bitstream. The decoding apparatus 300 may perform decoding using the processing unit applied to the encoding apparatus. Therefore, the processing unit for the decoding may be, for example, a coding unit, and the coding unit may be split according to the quad-tree structure, the binary-tree structure, and/or the ternary-tree structure from the coding tree unit or the maximum coding unit. One or more transform units may be derived from the coding unit. In addition, the reconstructed image signal decoded and output through the decoding apparatus 300 may be reproduced through a reproducing apparatus.

The decoding apparatus 300 may receive the signal output from the encoding apparatus illustrated in FIG. 2 in a form of the bitstream, and the received signal may be decoded through the entropy decoder 310. For example, the entropy decoder 310 may derive information (e.g., video/image information) necessary for the image reconstruction (or picture reconstruction) by parsing the bitstream. The video/image information may further include information about various parameter sets such as an adaptation parameter set (APS), a picture parameter set (PPS), a sequence parameter set (SPS), and a video parameter set (VPS). In addition, the video/image information may further include general constraint information. The decoding apparatus may decode the picture further based on the information about the parameter set and/or the general constraint information. The signaled/received information and/or syntax elements to be described later in this document may be decoded through the decoding procedure and acquired from the bitstream. For example, the entropy decoder 310 may decode information within the bitstream based on a coding method such as an exponential Golomb coding, a CAVLC, or a CABAC, and output a value of the syntax element necessary for the image reconstruction, and the quantized values of the residual-related transform coefficient. More specifically, the CABAC entropy decoding method may receive a bin corresponding to each syntax element from the bitstream, determine a context model using syntax element information to be decoded and decoding information of the neighboring block and the block to be decoded or information of the symbol/bin decoded in the previous stage, and generate a symbol corresponding to a value of each syntax element by predicting the probability of generation of the bin according to the determined context model to perform the arithmetic decoding of the bin. At this time, the CABAC entropy decoding method may determine the context model and then update the context model using the information of the decoded symbol/bin for a context model of a next symbol/bin. The information about prediction among the information decoded by the entropy decoder 310 may be provided to the predictor (the inter predictor 332 and the intra predictor 331), and a residual value at which the entropy decoding is performed by the entropy decoder 310, that is, the quantized transform coefficients and the related parameter information may be input to the residual processor 320. The residual processor 320 may derive a residual signal (residual block, residual samples, residual sample array). In addition, the information about filtering among the information decoded by the entropy decoder 310 may be provided to the filter 350. Meanwhile, a receiver (not illustrated) for receiving the signal output from the encoding apparatus may be further configured as the internal/external element of the decoding apparatus 300, or the receiver may also be a component of the entropy decoder 310. Meanwhile, the decoding apparatus according to this document may be called a video/image/picture decoding apparatus, and the decoding apparatus may also be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients to output the transform coefficients. The dequantizer 321 may rearrange the quantized transform coefficients in a two-dimensional block form. In this case, the rearrangement may be performed based on a coefficient scan order performed by the encoding apparatus. The dequantizer 321 may perform dequantization for the quantized transform coefficients using a quantization parameter (e.g., quantization step size information), and acquire the transform coefficients.

The inverse transformer 322 inversely transforms the transform coefficients to acquire the residual signal (residual block, residual sample array).

The predictor 330 may perform the prediction of the current block, and generate a predicted block including the prediction samples of the current block. The predictor may determine whether the intra prediction is applied or the inter prediction is applied to the current block based on the information about prediction output from the entropy decoder 310, and determine a specific intra/inter prediction mode.

The predictor may generate the predicted signal based on various prediction methods to be described later. For example, the predictor may not only apply the intra prediction or the inter prediction for the prediction of one block, but also apply the intra prediction and the inter prediction at the same time. This may be called a combined inter and intra prediction (CIIP). Further, the predictor may be based on an intra block copy (IBC) prediction mode, or a palette mode in order to perform prediction on a block. The IBC prediction mode or palette mode may be used for content image/video coding of a game or the like, such as screen content coding (SCC). The IBC basically performs prediction in a current picture, but it may be performed similarly to inter prediction in that it derives a reference block in a current picture. That is, the IBC may use at least one of inter prediction techniques described in the present document. The palette mode may be regarded as an example of intra coding or intra prediction. When the palette mode is applied, information on a palette table and a palette index may be included in the video/image information and signaled.

The intra predictor 331 may predict the current block with reference to the samples within the current picture. The referenced samples may be located neighboring to the current block according to the prediction mode, or may also be located away from the current block. The prediction modes in the intra prediction may include a plurality of non-directional modes and a plurality of directional modes. The intra predictor 331 may also determine the prediction mode applied to the current block using the prediction mode applied to the neighboring block.

The inter predictor 332 may induce the predicted block of the current block based on the reference block (reference sample array) specified by the motion vector on the reference picture. At this time, in order to decrease the amount of the motion information transmitted in the inter prediction mode, the motion information may be predicted in units of a block, a sub-block, or a sample based on the correlation of the motion information between the neighboring block and the current block. The motion information may include a motion vector and a reference picture index. The motion information may further include inter prediction direction (L0 prediction, L1 prediction, Bi prediction, or the like) information. In the case of the inter prediction, the neighboring block may include a spatial neighboring block existing within the current picture and a temporal neighboring block existing in the reference picture. For example, the inter predictor 332 may configure a motion information candidate list based on the neighboring blocks, and derive the motion vector and/or the reference picture index of the current block based on received candidate selection information. The inter prediction may be performed based on various prediction modes, and the information about the prediction may include information indicating the mode of the inter prediction of the current block.

The adder 340 may add the acquired residual signal to the predicted signal (predicted block, prediction sample array) output from the predictor (including the inter predictor 332 and/or the intra predictor 331) to generate the reconstructed signal (reconstructed picture, reconstructed block, reconstructed sample array). As in the case where the skip mode is applied, if there is no residual for the block to be processed, the predicted block may be used as the reconstructed block.

The adder 340 may be called a reconstructor or a reconstructed block generator. The generated reconstructed signal may be used for the intra prediction of a next block to be processed within the current picture, and as described later, may also be output through filtering or may also be used for the inter prediction of a next picture.

Meanwhile, a luma mapping with chroma scaling (LMCS) may also be applied in the picture decoding process.

The filter 350 may apply filtering to the reconstructed signal, thereby improving the subjective/objective image qualities. For example, the filter 350 may apply various filtering methods to the reconstructed picture to generate a modified reconstructed picture, and transmit the modified reconstructed picture to the memory 360, specifically, the DPB of the memory 360. Various filtering methods may include, for example, a deblocking filtering, a sample adaptive offset, an adaptive loop filter, a bidirectional filter, and the like.

The (modified) reconstructed picture stored in the DPB of the memory 360 may be used as the reference picture in the inter predictor 332. The memory 360 may store motion information of the block in which the motion information within the current picture is derived (decoded) and/or motion information of the blocks within the previously reconstructed picture. The stored motion information may be transferred to the inter predictor 260 to be utilized as motion information of the spatial neighboring block or motion information of the temporal neighboring block. The memory 360 may store the reconstructed samples of the reconstructed blocks within the current picture, and transfer the stored reconstructed samples to the intra predictor 331.

In the present specification, the exemplary embodiments described in the filter 260, the inter predictor 221, and the intra predictor 222 of the encoding apparatus 200 may be applied equally to or to correspond to the filter 350, the inter predictor 332, and the intra predictor 331 of the decoding apparatus 300, respectively.

Meanwhile, as described above, in performing video coding, prediction is performed to improve compression efficiency. Through this, a predicted block including prediction samples for a current block as a block to be coded (i.e., a coding target block) may be generated. Here, the predicted block includes prediction samples in a spatial domain (or pixel domain). The predicted block is derived in the same manner in an encoding apparatus and a decoding apparatus, and the encoding apparatus may signal information (residual information) on residual between the original block and the predicted block, rather than an original sample value of an original block, to the decoding apparatus, thereby increasing image coding efficiency. The decoding apparatus may derive a residual block including residual samples based on the residual information, add the residual block and the predicted block to generate reconstructed blocks including reconstructed samples, and generate a reconstructed picture including the reconstructed blocks.

The residual information may be generated through a transform and quantization procedure. For example, the encoding apparatus may derive a residual block between the original block and the predicted block, perform a transform procedure on residual samples (residual sample array) included in the residual block to derive transform coefficients, perform a quantization procedure on the transform coefficients to derive quantized transform coefficients, and signal related residual information to the decoding apparatus (through a bit stream). Here, the residual information may include value information of the quantized transform coefficients, location information, a transform technique, a transform kernel, a quantization parameter, and the like. The decoding apparatus may perform dequantization/inverse transform procedure based on the residual information and derive residual samples (or residual blocks). The decoding apparatus may generate a reconstructed picture based on the predicted block and the residual block. Also, for reference for inter prediction of a picture afterward, the encoding apparatus may also dequantize/inverse-transform the quantized transform coefficients to derive a residual block and generate a reconstructed picture based thereon.

Meanwhile, when intra prediction is performed, correlation between samples may be utilized, and a difference between the original block and a prediction block, namely, residuals may be obtained. The transformation and quantization described above may be applied to the residuals, through which spatial redundancy may be removed. In what follows, encoding and decoding methods employing intra prediction will be described in detail.

Intra prediction refers to prediction for generating prediction samples for a current block based on external reference samples of the current block in a picture to which the current block belongs (hereinafter, referred to as a current picture). Here, the external reference samples of the current block may refer to the samples located in the vicinity of the current block. When intra prediction is applied to the current block, neighboring reference samples to be used for intra prediction of the current block may be derived.

For example, when the size (width×height) of a current block is nW×nH, the neighboring reference samples of the current block may include samples adjacent to the left boundary of the current block and a total of 2×nH samples adjacent to the bottom-left corner, samples adjacent to the top boundary of the current block and a total of 2×nW samples adjacent to the top-right corner, and one sample adjacent to the top-left corner of the current block. Alternatively, neighboring reference samples of the current block may include a plurality of columns of top neighboring samples and a plurality of rows of left neighboring samples. In addition, neighboring reference samples of the current block may include a total of nH samples adjacent to the right boundary of the current block, a total of nW samples adjacent to the bottom boundary of the current block, and one sample adjacent to the bottom-right corner of the current block.

However, some of the neighboring reference samples of the current block may not have been decoded yet or may not be available. In this case, the decoding apparatus may construct neighboring reference samples to be used for prediction by substituting unavailable samples with available samples. Alternatively, neighboring reference samples to be used for prediction may be constructed through interpolation of the available samples.

When neighboring reference samples are derived, (i) a prediction sample may be derived based on average or interpolation of neighboring reference samples of the current block, or (ii) the prediction sample may be derived based on a reference sample located in a specific (prediction) direction with respect to the prediction sample among neighboring reference samples of the current block. The case of (i) may be applied when the intra prediction mode is a non-directional mode or a non-angular mode while the case (ii) may be applied when the intra prediction mode is a directional mode or an angular mode.

Also, the prediction sample may be generated through interpolation between a first neighboring sample located in a prediction direction of the intra prediction mode of the current block based on the current block's prediction sample among neighboring reference samples and a second neighboring sample located in the opposite direction of the prediction direction. The above case may be referred to as linear interpolation intra prediction (LIP). Also, chroma prediction samples may be generated based on luma samples using a linear model. This case may be referred to as LM mode.

Also, a prediction sample of the current block may be derived by deriving a temporary prediction sample of the current block based on filtered neighboring reference samples and using a weighted sum of at least one reference sample derived according to the intra prediction mode among existing neighboring reference samples, that is, unfiltered neighboring reference samples, and the temporary prediction sample. The above case may be referred to as Position Dependent Intra Prediction (PDPC).

Also, intra prediction encoding may be performed by selecting a reference sample line having the highest prediction accuracy among a plurality of neighboring reference sample lines of the current block to derive a prediction sample using a reference sample located in the prediction direction of the corresponding line and indicating (signaling) the used reference sample line to the decoding apparatus. The above case may be referred to as Multi-Reference Line (MRL) intra prediction or MRL-based intra prediction.

Also, the current block may be divided into vertical or horizontal sub-partitions to perform intra prediction under the same intra prediction mode, where neighboring reference samples may be derived and used in units of sub-partitions. In other words, while intra prediction mode for the current block may be applied in the same way for all of the sub-partitions, intra prediction performance may be improved depending on the situations by deriving and using neighboring reference samples in units of sub-partitions. The prediction method above may be referred to as Intra Sub-Partitions (ISP) or ISP-based intra prediction.

The intra prediction methods may be referred to as an intra prediction type to be distinguished from the intra prediction mode. The intra prediction type may be called by various terms such as an intra prediction scheme or an additional intra prediction mode. For example, the intra prediction type (or the additional intra prediction mode) may include at least one of the LIP, PDPC, MRL, and ISP. A general intra prediction method except for the specific intra prediction type such as the LIP, PDPC, MRL, and ISP may be referred to as a normal intra prediction type. The normal intra prediction type may be applied commonly when the specific intra prediction type is not applied, and prediction may be performed based on the intra prediction mode. Meanwhile, depending on the needs, post-filtering may be performed on the derived prediction sample.

Figure 4:
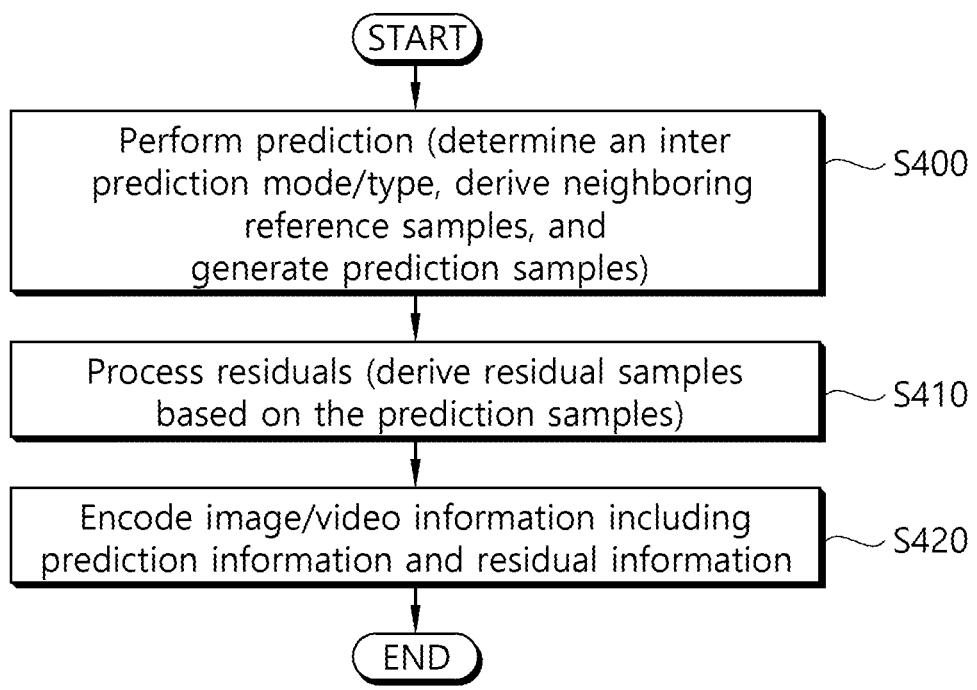
FIG. 4 illustrates one example of an image encoding method based on intra prediction to which embodiments of the present disclosure may be applied.
Figure 5:
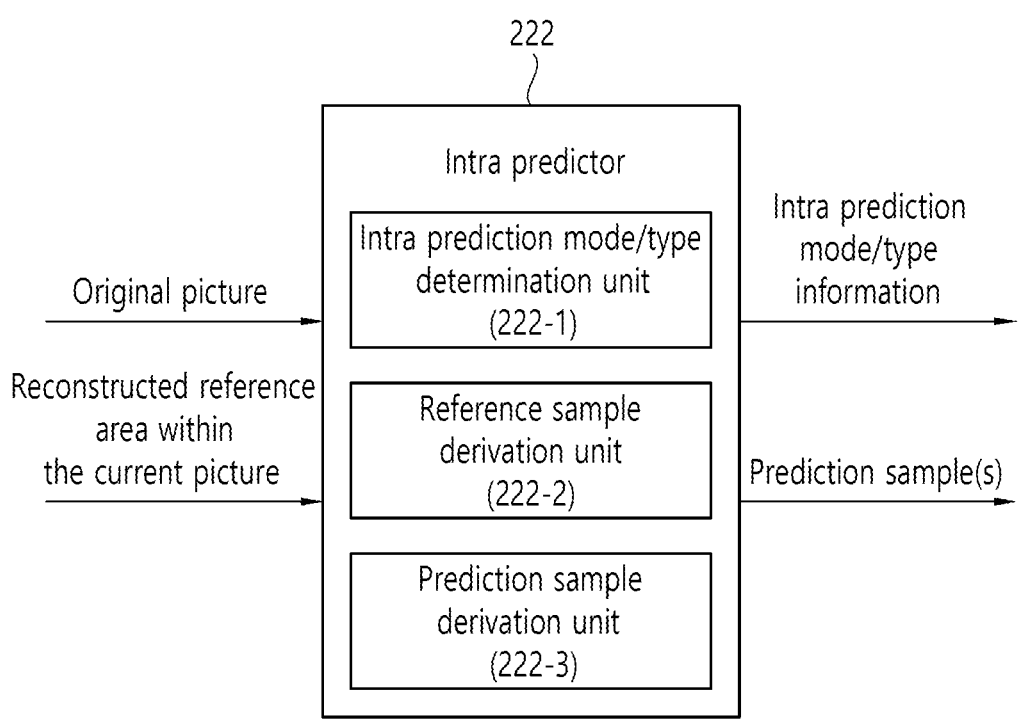
FIG. 5 illustrates an intra predictor in an encoding apparatus.

FIG. 4 illustrates one example of an image encoding method based on intra prediction to which embodiments of the present disclosure may be applied, and FIG. 5 illustrates an intra predictor in an encoding apparatus. The intra predictor within the encoding apparatus of FIG. 5 may be applied in the same way or in such a way to correspond to the intra predictor 222 of the encoding apparatus 200 of FIG. 2.

Referring to FIGS. 4 and 5, S400 may be performed by the intra predictor 222 of the encoding apparatus, and S410 may be performed by the residual processor 230 of the encoding apparatus. More specifically, S410 may be performed by the subtractor 231 of the encoding apparatus. In the step of S420, prediction information may be derived by the intra predictor 222 and encoded by the entropy encoder 240. In the step of S420, residual information may be derived by the residual processor 230 and encoded by the entropy encoder 240. The residual information is the information on residual samples. The residual information may include information on the quantized transform coefficients for the residual samples. As described above, residual samples may be derived as transform coefficients through the transformer 232 of the encoding apparatus, and the transform coefficients may be derived as quantized transform coefficients through the quantizer 233. The information on the quantized transform coefficients may be encoded by the entropy encoder 240 through a residual coding procedure.

The encoding apparatus performs intra prediction on the current block S400. The encoding apparatus may derive an intra prediction mode/type for the current block, derive neighboring reference samples of the current block, and generate prediction samples in the current block based on the intra prediction mode/type and the neighboring reference samples. Here, procedures for determining the intra prediction mode/type, deriving the neighboring reference samples, and generating the prediction samples may be performed simultaneously, or one procedure may be performed before the others.

For example, the intra predictor 222 of the encoding apparatus may include an intra prediction mode/type determination unit 222-1, a reference sample derivation unit 222-2, and a prediction sample derivation unit 222-3; the intra prediction mode/type determination unit 222-1 may determine an intra prediction mode/type for the current block; a reference sample derivation unit 222-2 may derive neighboring reference samples of the current block; and the prediction sample derivation unit 222-3 may derive prediction samples of the current block. Although not shown, when a prediction sample filtering procedure is performed, the intra predictor 222 may further include a prediction sample filter (not shown). The encoding apparatus may determine a mode/type applied to the current block among a plurality of intra prediction modes/types. The encoding apparatus may compare the RD cost for the intra prediction modes/types and determine the optimal intra prediction mode/type for the current block.

As described above, the encoding apparatus may perform a prediction sample filtering procedure. Prediction sample filtering may be referred to as post filtering. Some or all of the prediction samples may be filtered by the prediction sample filtering procedure. In some cases, the prediction sample filtering procedure may be omitted.

The encoding apparatus generates residual samples for the current block based on the (filtered) prediction samples S410. The encoding apparatus may compare prediction samples with the original samples of the current block in terms of phases and derive residual samples.

The encoding apparatus may encode image information including information on intra prediction (prediction information) and residual information on the residual samples S420. The prediction information may include intra prediction mode information and intra prediction type information. The residual information may include residual coding syntax. The encoding apparatus may derive quantized transform coefficients by transforming/quantizing the residual samples. The residual information may include information on the quantized transform coefficients.

The encoding apparatus may output encoded image information in the form of a bitstream. The output bitstream may be delivered to the decoding apparatus through a storage medium or a network.

As described above, the encoding apparatus may generate a reconstructed picture (including reconstructed samples and a reconstructed block). To this end, the encoding apparatus may derive (modified) residual samples by applying dequantization/inverse transformation again to the quantized transform coefficients. The reason why dequantization/inverse transformation is performed again after residual samples are transformed/quantized is to derive residual samples which are the same as the residual samples derived from the decoding apparatus as described above. The encoding apparatus may generate a reconstructed block including reconstructed samples for the current block based on the prediction samples and (modified) residual samples. Based on the reconstructed block, a reconstructed picture may be generated for the current picture. As described above, an in-loop filtering procedure may be further applied to the reconstructed picture.

Figure 6:
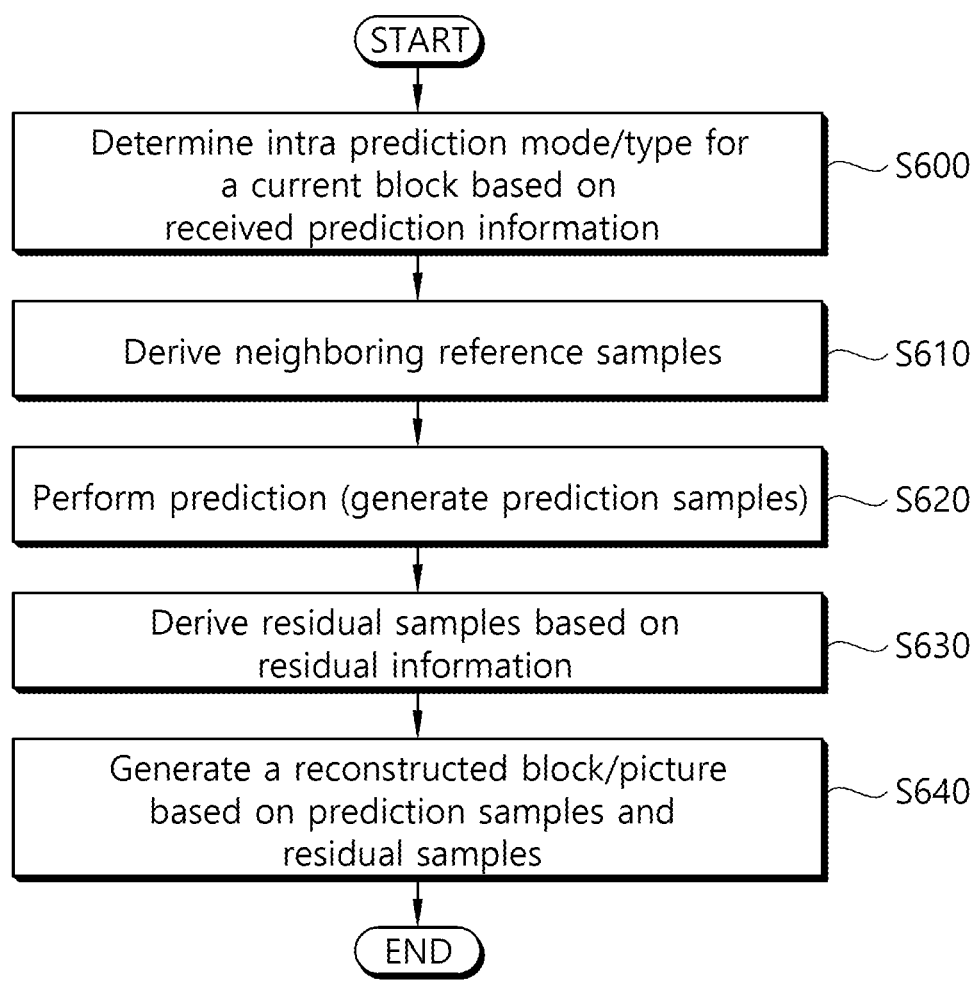
FIG. 6 illustrates one example of an image decoding method based on intra prediction to which embodiments of the present disclosure may be applied.
Figure 7:
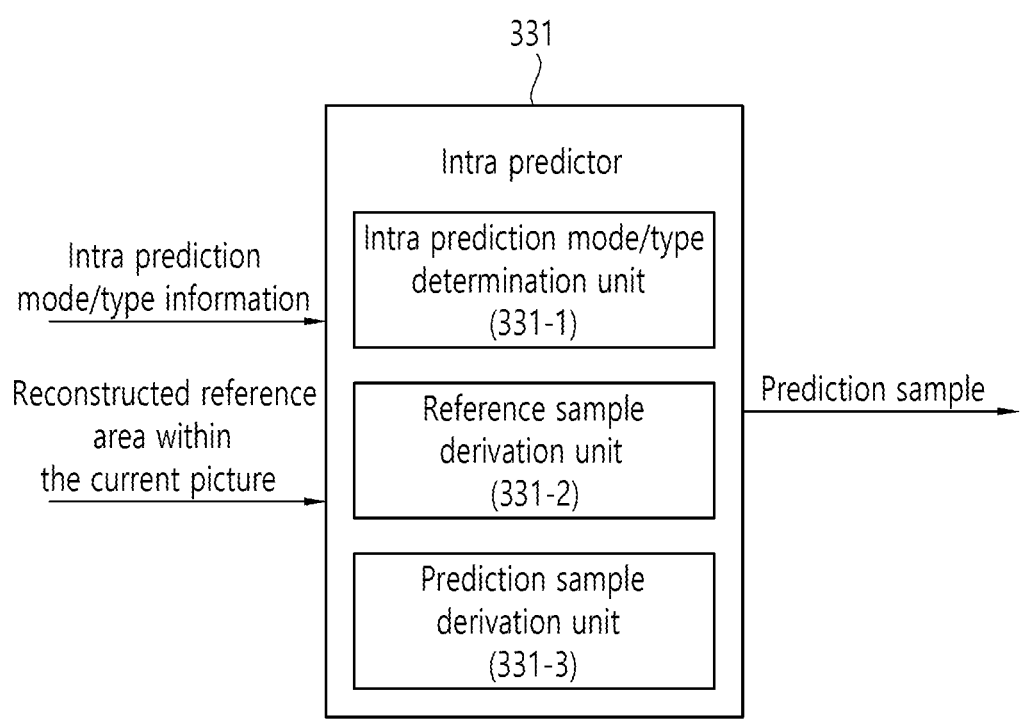
FIG. 7 illustrates an intra predictor in a decoding apparatus.

FIG. 6 illustrates one example of an image decoding method based on intra prediction to which embodiments of the present disclosure may be applied, and FIG. 7 illustrates an intra predictor in a decoding apparatus. The intra predictor within the decoding apparatus of FIG. 7 may be applied in the same way or in such a way to correspond to the intra predictor 331 of the decoding apparatus 300 of FIG. 3.

Referring to FIGS. 6 and 7, the decoding apparatus may perform an operation corresponding to the operation performed in the encoding apparatus. The steps of S600 to S620 may be performed by the intra predictor 331 of the decoding apparatus, and prediction information of S600 and residual information of S630 may be obtained from a bitstream by the entropy decoder 310 of the decoding apparatus. The residual processor 320 of the decoding apparatus may derive residual samples for the current block based on the residual information. Specifically, the dequantizer 321 of the residual processor 320 may derive transform coefficients by performing dequantization based on the quantized transform coefficients derived based on the residual information and derive residual samples for the current block by performing inverse transformation on the transform coefficients. The step of S640 may be performed by the adder 340 or the reconstructor of the decoding apparatus.

The decoding apparatus may derive the intra prediction mode/type for the current block based on the received prediction information (intra prediction mode/type information) S600. The decoding apparatus may derive neighboring reference samples of the current block S610. The decoding apparatus generates prediction samples within the current block based on the intra prediction mode/type and neighboring reference samples S620. In this case, the decoding apparatus may perform a prediction sample filtering procedure. Prediction sample filtering may be referred to as post filtering. Some or all of the prediction samples may be filtered by the prediction sample filtering procedure. In some cases, the prediction sample filtering procedure may be omitted.

The decoding apparatus generates residual samples for the current block based on the received residual information S630. The decoding apparatus may generate reconstructed samples for the current block based on the prediction samples and the residual samples and generate a reconstructed block including the reconstructed samples S640. A reconstructed picture may be generated for a current picture based on the reconstructed block. As described above, the in-loop filtering procedure may be further applied to the reconstructed picture.

Here, the intra predictor 331 of the decoding apparatus may include an intra prediction mode determination unit 331-1, a reference sample derivation unit 331-2, and a prediction sample derivation unit 331-2; the intra prediction mode/type determination unit 331-1 may determine an intra prediction mode/type for the current block based on the intra prediction mode/type information obtained by the entropy decoder 310; the reference sample derivation unit 331-2 may derive neighboring reference samples of the current block; and the prediction sample derivation unit 331-3 may derive prediction samples of the current block. Although not shown, when the prediction sample filtering procedure described above is performed, the intra predictor 331 may further include a prediction sample filter (not shown).

The intra prediction mode information may include, for example, flag information (for example, intra_luma_mpm_flag) indicating whether a Most Probable Mode (MPM) is applied to the current block or a remaining mode is applied to the current block. When the MPM is applied to the current block, the prediction mode information may further include index information (for example, intra_luma_mpm_idx) indicating one of the intra prediction mode candidates (MPM candidates). The intra prediction mode candidates (MPM candidates) may comprise an MPM candidate list or an MPM list. Also, when the MPM is not applied to the current block, the intra prediction mode information may further include remaining mode information (for example, intra_luma_mpm_remainder) indicating one of the remaining intra prediction modes except for the intra prediction mode candidates (MPM candidates). The decoding apparatus may determine the intra prediction mode of the current block based on the intra prediction mode information.

Also, the intra prediction type information may be implemented in various forms. As one example, the intra prediction type information may include intra prediction type index information indicating one of the intra prediction types. As another example, the intra prediction type information may include at least one of the reference sample line information (for example, intra_luma_ref_idx) indicating whether MRLs are applied to the current block and which reference sample line is used when the MRLs are applied, the ISP flag information (for example, intra_subpartitions_mode_flag) indicating whether ISP is applied to the current block, the ISP type information (for example, intra_subpartitions_split_flag) indicating a split type of sub-partitions, the flag information indicating whether PDCP is applied, or the flag information indicating whether the LIP is applied. Also, the intra prediction type information may include an MIP flag indicating whether the MIP is applied to the current flag.

The intra prediction mode information and/or intra prediction type information may be encoded/decoded through the coding method described in this document. For example, the intra prediction mode information may be encoded/decoded through entropy coding (for example, CABAC or CAVLC) based on a truncated (rice) binary code.

Meanwhile, when intra prediction is applied, an intra prediction mode applied to a current block may be determined using an intra prediction mode of a neighboring block. For example, the decoding apparatus may select, based on a received mpm index, one of mpm candidates within the mpm list derived based on the intra prediction mode of a neighboring block (for example, a left and/or top neighboring block) of the current block and additional candidate modes or select one of the other remaining intra prediction modes not included in the mpm candidates (and planar mode) based on the remaining intra prediction mode information. The mpm list may be constructed to include or not include a planar mode as a candidate. For example, when the mpm list includes a planar mode as a candidate, the mpm list may have six candidates. Otherwise, the mpm list may have five candidates. When the mpm list does not include the planar mode as a candidate, a not-planar flag (for example, intra_luma_not_planar_flag) indicating whether or not the intra prediction mode of the current block is a planar mode may be signaled. For example, when the mpm flag is signaled first, the mpm index and the not-planar flag may be signaled when the value of the mpm flag is 1. Also, the mpm index may be signaled when the value of the not-planar flag is 1. Here, constructing an mpm list not to include the planar mode as a candidate is intended first to check whether the intra prediction mode is a planar mode through signaling of the not-planar flag, which is not meant to indicate that the planar mode is not mpm but to reflect the fact that the planar mode is always considered to be the mpm.

For example, whether an intra prediction mode applied to a current block is included in the mpm candidates (and planar mode) or in the remaining mode may be indicated based on the mpm flag (for example, intra_luma_mpm_flag). When the mpm flag is 1, it may indicate that the intra prediction mode for the current block is included in the mpm candidates (and planar mode) while, when the mpm flag is 0, it may indicate that the intra prediction mode for the current block is not included in the mpm candidates (and planar mode). When the not-planar flag (for example, intra_luma_notplanar_flag) is 0, it may indicate that the intra prediction mode for the current block is the planar mode while, when the not-planar flag is 1, it may indicate that the intra prediction mode for the current block is not the planar mode. The mpm index may be signaled in the form of mpm_idx or intra_luma_mpm_idx syntax element, and the remaining intra prediction mode information may be signaled in the form of rem_intra_luma_pred_mode or intra_luma_mpm_remainder syntax element. For example, the remaining intra prediction mode information may be signaled in the form of rem_intra_luma_pred_mode or intra_luma_mpm_remainder syntax element. For example, the remaining intra prediction mode information may indicate one of the remaining intra prediction modes not included in the mpm candidates (and planar mode) among the entire intra prediction modes by indexing the remaining intra prediction modes in order of prediction mode number. The intra prediction mode may be related to the luma component (sample). In what follows, the intra prediction mode information may include at least one of the mpm flag (for example, intra_luma_mpm_flag), not-planar flag (for example, intra_luma_not_planar_flag), mpm index (for example, mpm_idx or intra_luma_mpm_idx), and remaining intra prediction mode information (for example, rem_intra_luma_pred_mode or intra_luma_mpm_remainder). In the present disclosure, the MPM list may be called by various terms such as an MPM candidate list or candModeList.

In general, when block splitting is performed on an image, a current block and a neighboring block to be coded have similar image characteristics. Therefore, the current block and the neighboring block have a high probability of having the same or similar intra prediction mode. Thus, the encoder may use the intra prediction mode of the neighboring block to encode the intra prediction mode of the current block. For example, the encoder/decoder may configure a most probable mode (MPM) list for a current block. The MPM list may be called an MPM candidate list. Here, the MPM may mean a mode used to enhance coding efficiency by considering similarity between a current block and a neighboring block at the time of intra prediction mode coding.

Figure 8:
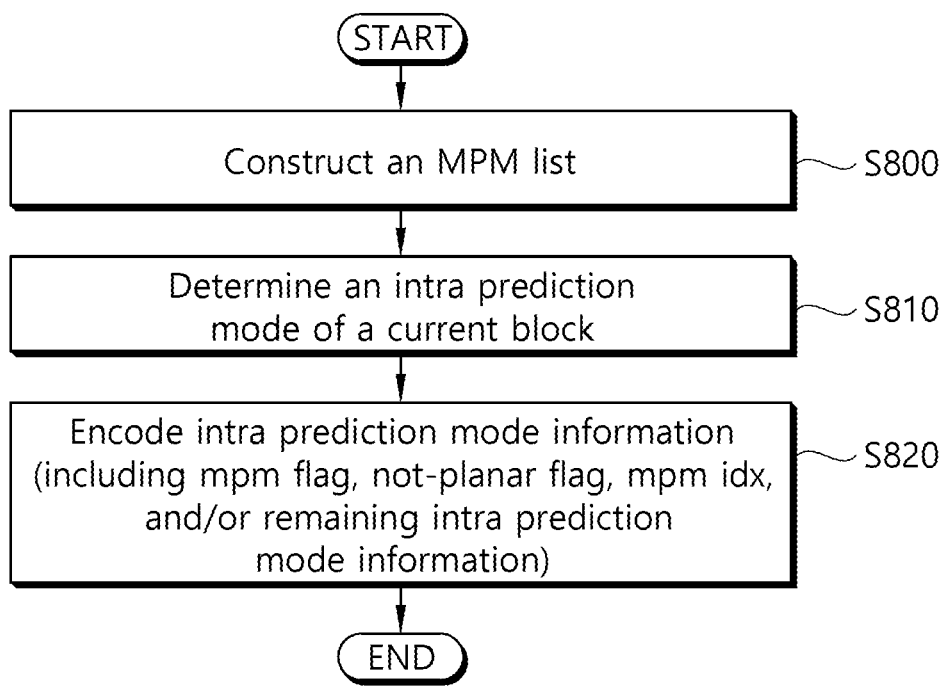
FIG. 8 illustrates one example of an MPM mode-based intra prediction method of an encoding apparatus to which embodiments of the present disclosure may be applied.

FIG. 8 illustrates one example of an MPM mode-based intra prediction method of an encoding apparatus to which embodiments of the present disclosure may be applied.

Referring to FIG. 8, the encoding apparatus constructs an MPM list for a current block S800. The MPM list may include candidate intra prediction modes (MPM candidates) highly likely to be applied to the current block. The MPM list may include the intra prediction mode of a neighboring block and may further include specific intra prediction modes according to a predetermined method. A specific method for constructing an MPM list will be described later.

The encoding apparatus determines the intra prediction mode of the current block S810. The encoding apparatus may perform prediction based on various intra prediction modes and determine the optimal intra prediction mode based on Rate-Distortion Optimization (RDO) using the prediction. In this case, the encoding apparatus may determine the optimal intra prediction mode using only the MPM candidates and the planar mode configured in the MPM list or determine the optimal intra prediction mode by further using the remaining intra prediction modes as well as the MPM candidates and the planar mode configured in the MPM list.

Specifically, for example, when the intra prediction type of the current block is a specific type (for example, LIP, MRL, or ISP) rather than the normal intra prediction type, the encoding apparatus may determine the optimal intra prediction mode by considering only the MPM candidates and the planar mode as the intra prediction mode candidates for the current block. In other words, the intra prediction mode for the current block may be determined only among the MPM candidates and the planar mode, where, in this case, the mpm flag may not be encoded/signaled. The decoding apparatus, in this case, may assume that the mpm flag is 1 even without receiving separate signaling of the mpm flag.

In general, when the intra prediction mode of a current block is not the planar mode but one of the MPM candidates in the MPM list, the encoding apparatus generates an mpm index (mpm idx) indicating one of the MPM candidates. If the intra prediction mode of the current block is not included in the MPM list either, the encoding apparatus generates remaining intra prediction mode information indicating a mode which is the same as the intra prediction mode of the current block among the remaining intra prediction modes not included in the MPM list (and the planar mode).

The encoding apparatus may encode the intra prediction mode information and output the encoded information in the form of a bitstream S820. The intra prediction mode information may include the mpm flag, not-planar flag, mpm index, and/or remaining intra prediction mode information described above. In general, the mpm index information and the remaining intra prediction mode information have an alternative relationship and are not signaled simultaneously in indicating an intra prediction mode for one block. In other words, the mpm flag value of 1 and the not-planar flag or the mpm index may be signaled together, or the mpm flag value of 0 and the remaining intra prediction mode information are signaled together. However, as described above, when a specific intra prediction type is applied to the current block, the mpm flag may not be signaled, but only the non-planar flag and/or the mpm index may be signaled. That is, in this case, the intra prediction mode information may include only the not-planar flag and/or the mpm index.

Figure 9:
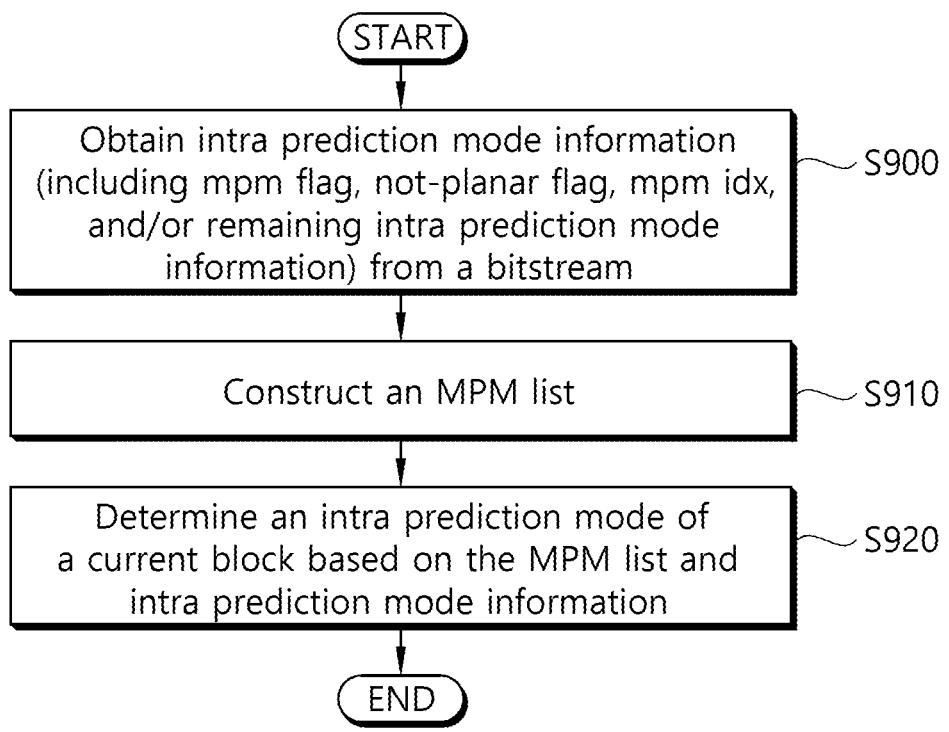
FIG. 9 illustrates one example of an MPM mode-based intra prediction method in a decoding apparatus to which embodiments of the present disclosure may be applied.

FIG. 9 illustrates one example of an MPM mode-based intra prediction method in a decoding apparatus to which embodiments of the present disclosure may be applied. The decoding apparatus of FIG. 9 may determine an intra prediction mode in response to the intra prediction mode information determined and signaled by the encoding apparatus of FIG. 8.

Referring to FIG. 9, the decoding apparatus obtains intra prediction mode information from a bitstream S900. As described above, the intra prediction mode information may include at least one of an mpm flag, a not-planar flag, an mpm index, and a remaining intra prediction mode.

The decoding apparatus constructs an MPM list S910. The MPM list is constructed in the same way as the MPM list constructed by the encoding apparatus. In other words, the MPM list may include an intra prediction mode of a neighboring block and may further include specific intra prediction modes according to a predetermined method. A specific method for constructing an MPM list will be described later.

Although the S910 step is described to be performed after the S900 step, the execution order is only an example, and the S910 step may be performed before the S900 step or may be performed at the same time with the S900 step.

The decoding apparatus determines an intra prediction mode of the current block based on the MPM list and the intra prediction mode information S920.

As one example, when a value of the mpm flag is 1, the decoding apparatus may derive a planar mode as an intra prediction mode of the current block or derive a candidate indicated by the mpm index among MPM candidates in the (not-planar flag-based) MPM list as an intra prediction mode of the current block. Here, MPM candidates may include only the candidates included in the MPM list or further include a planar mode that may be applied to the case when a value of the mpm flag is 1, in addition to the candidates included in the MPM list.

As another example, when a value of the mpm flag is 0, the decoding apparatus may derive an intra prediction mode indicated by the remaining intra prediction mode information among the remaining intra prediction modes not included in the MPM list and the planar mode as an intra prediction mode of the current block.

As yet another example, when the intra prediction type of the current block is a specific type (for example, LIP, MRL, or ISP), the decoding apparatus may derive a candidate indicated by the planar mode or the mpm index within the MPM list as an intra prediction mode of the current block even without checking the mpm flag.

Meanwhile, the intra prediction mode may include non-directional (or non-angular) intra prediction modes and directional (or angular) intra prediction modes. For example, the HEVC standard uses intra prediction modes, including two non-directional prediction modes and 33 directional prediction modes. A non-directional prediction mode may include planar intra prediction mode 0 and DC intra prediction mode 1, while a directional prediction mode may include intra prediction modes 2 to 34. A planar intra prediction mode may be called a planar mode, and a DC intra prediction mode may be called a DC mode.

To capture a particular edge direction found in a natural video, the directional intra prediction modes may be extended from the existing 33 modes to 65 modes, as in FIG. 10 to be described later. In this case, an intra prediction mode may include two non-directional intra prediction modes and 65 angular intra prediction modes. The non-directional intra prediction modes may include a planar intra prediction mode No. 0 and a DC intra prediction mode No. 1, and the directional intra prediction modes may include intra prediction modes No. 2 to No. 66. The extended directional intra prediction modes may be applied to blocks of all sizes and may be applied to both the luma and chroma components. However, the description above is only an example, and embodiments of the present disclosure may also be applied to the case where the number of intra prediction modes is different from the example. An intra prediction mode No. 67 may be further utilized depending on the situation, where the intra prediction mode No. 67 may represent a Linear Model (LM) model.

Figure 10:
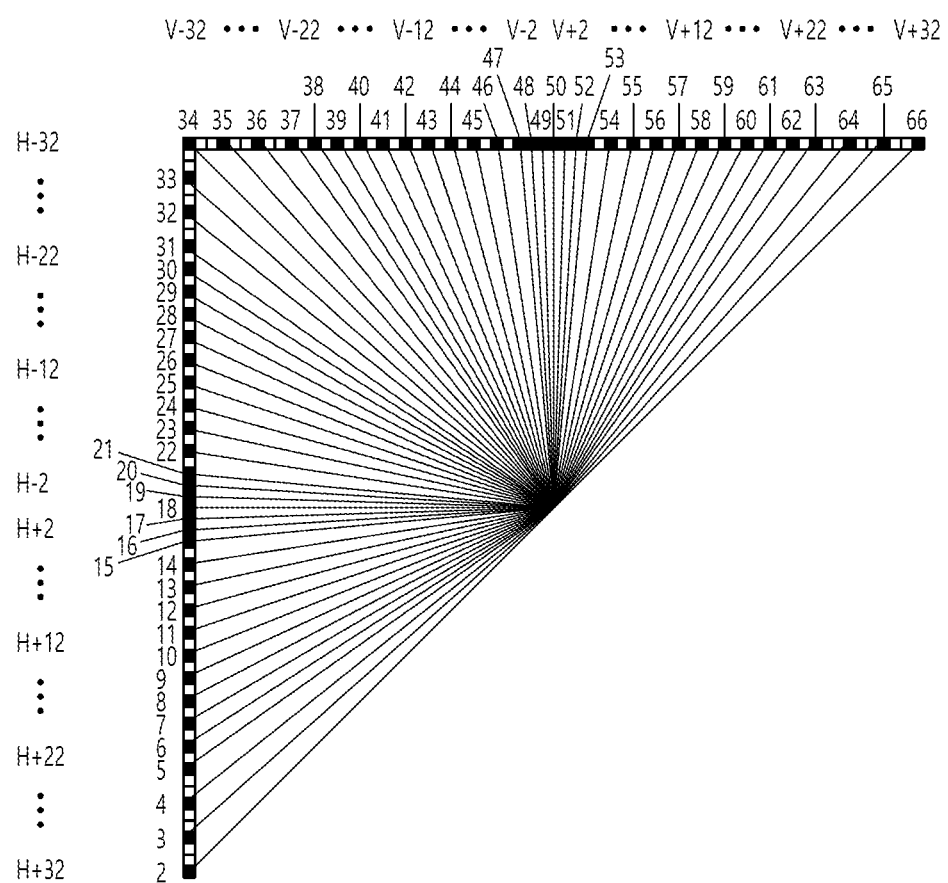
FIG. 10 illustrates one example of intra prediction modes to which embodiments of the present disclosure may be applied.

FIG. 10 illustrates one example of intra prediction modes to which embodiments of the present disclosure may be applied.

Referring to FIG. 10, an intra prediction mode having horizontal directionality and an intra prediction mode having vertical directionality may be distinguished from each other based on an intra prediction mode No. 34 having an upward left diagonal prediction direction. H and V of FIG. 10 represent horizontal directionality and vertical directionality, respectively, and numbers from −32 to 32 represent a displacement in 1/32 units on sample grid positions. The intra prediction modes No. 2 to No. 33 have horizontal directionality, and the intra prediction modes No. 34 to 66 have vertical directionality. The intra prediction mode No. 18 and the intra prediction mode No. 50 represent a horizontal intra prediction mode and a vertical intra prediction mode, respectively; the intra prediction mode No. 2 may be called a downward-left diagonal intra prediction mode, the intra prediction mode No. 34 an upward left diagonal intra prediction mode, and the intra prediction mode No. 66 an upward right diagonal intra prediction mode.

Meanwhile, intra prediction may use MRLs employing multiple reference lines. The MRL method may perform intra prediction using neighboring samples located along a sample line separated from the top and/or left side of the current block by one to three sample distances as reference samples.

Figure 11:
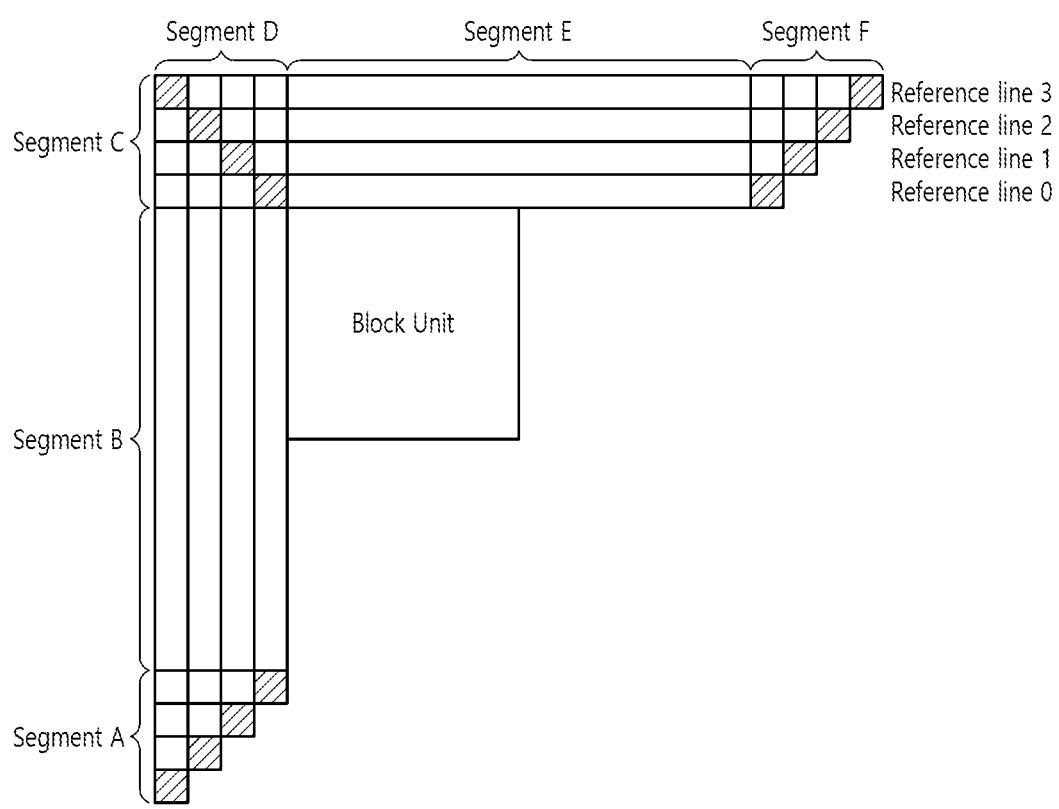
FIG. 11 illustrates one example of reference samples lines for intra prediction using multi-reference lines.

FIG. 11 illustrates one example of reference samples lines for intra prediction using multi-reference lines. The block unit of FIG. 11 may represent a current block.

In one embodiment, intra prediction may use reference samples adjacent to a current block (or reference samples closest to the current block, namely, reference samples located at zero sample distance from the current block) as reference samples for prediction. In another embodiment, Multiple Reference Line (MRL) intra prediction uses reference samples located at K sample distances (where K is an integer larger than or equal to 1) from the left and top boundaries of the current block, providing more options for reference samples and more accurate prediction performance than the intra prediction using reference samples closest to the current block (namely, located at zero sample distance). A reference sample of the current block may be referred to as a neighboring sample of the current block or a reference line sample of the current block, and a reference line sample may be referred to as a sample on the reference line.

Referring to FIG. 11, positions of neighboring reference samples located at zero, one, two, and three sample distances from the current block may be called reference lines 0, 1, 2, and 3, respectively. A reference line may be indicated by a reference sample line, a reference sample row, or a reference sample column, or simply by lines, rows, or columns. Reference lines 0, 1, 2, and 3 may be located in the order closest to the current block. In one example, multi-reference line intra prediction may be performed using reference lines 1 and 2. In another example, multi-reference line intra prediction may be performed using reference lines 1 and 3. However, it should be noted that the multi-reference line intra prediction of the present disclosure is not necessarily limited to the examples above.

Also, MRL-based intra prediction may signal reference line information for indicating which reference line is used. For example, reference line information may be signaled in the form of intra_luma_ref_idx syntax element. When a value of intra_luman_ref_idx is 0, it may indicate that intra prediction is performed using reference samples first closest to the current block (namely, samples located at zero sample distance). When intra_luma_ref_idx is 1, it may indicate that intra prediction is performed using reference samples second closest to the current block (namely, samples located at one sample distance). When intra_luma_ref_idx is 2, it may indicate that intra prediction is performed using reference samples third or fourth closest to the current block (namely, samples located at two or three sample distances).

In what follows, a method for constructing an MPM list when MRL-based intra prediction is performed and a method for performing intra prediction by deriving neighboring reference samples in a DC mode will be described.

FIG. 12 illustrates one embodiment of a method for deriving prediction samples in a DC mode.

For the sake of convenience, FIG. 12 gives a description using an example in which reference samples first closest to a current block (namely, samples located at zero sample distance) are used. In other words, FIG. 12 illustrates reference samples used in a DC mode when a value of reference line index information (for example, intra_luma_ref_idx) is 0. The method disclosed in FIG. 12 may be applied in the same way to a DC mode when a value of the reference line index information (for example, intra_luma_ref_idx) is not 0.

Referring to FIG. 12(a), when the current block is a square block (for example, a 4×4 block) and the intra prediction of the current block is a DC mode, neighboring reference samples used for intra prediction of the DC mode may be derived. At this time, the neighboring reference samples may include left reference samples (E, F, G, H) located in the left neighborhood of the current block and top reference samples (A, B, C, D) located in the top neighborhood of the current block. In this case, an average is calculated using the left reference samples (E, F, G, H) and the top reference samples (A, B, C, D), and a DC value (dcVal) may be derived based on the calculated average. The samples within the current block (the area filled with slash lines in FIG. 12(a)) may be filled with the DC value (dcVal). In other words, the samples filled with the DC value (dcVal) may be referred to as prediction samples.

Referring to FIG. 12(b), when the current block is a non-square block (for example, an 8×4 block) and the intra prediction of the current block is a DC mode, neighboring reference samples used for intra prediction of the DC mode may be derived. At this time, the neighboring reference samples may include reference samples located on the longer side of the width and the height of the non-square block. Since the width (namely, the horizontal length) of an 8×4 block shown in FIG. 12(b) has a larger value, top reference samples located in the neighborhood of the width side (A, B, C, D, E, F, G, and H) may be derived as neighboring reference samples. In this case, an average is calculated using the top reference samples (A, B, C, D, E, F, G, and H), and a DC value (dcVal) may be derived based on the calculated average. The samples within the current block (the area filled with slash lines in FIG. 12(b)) may be filled with the DC value (dcVal). In other words, the samples filled with the DC value (dcVal) may be referred to as prediction samples.

As described above, different from a square block, when an average is calculated for a non-square block using all of the left reference samples and the top reference samples, since a divisor value is not in the form of $2^n$, a division operation has to be used. To change the division operation to a shift operation, as described above, a DC value may be calculated using only the reference samples located on the longer side of the width and the height of the non-square block.

When the current block is a non-square block in a DC mode, the embodiment of FIG. 12 compares the width (namely, horizontal length) with the height (namely, vertical length), calculates a DC value using only the reference samples on the longer side, and derives the reference samples as prediction samples of the current block. Since the method above uses only the reference samples on either side of the width and the height (namely, the side with a longer length), prediction accuracy may be degraded. Therefore, in what follows, a method for generating prediction samples by calculating a DC value using all of the left and top reference samples when the current block is a non-square block will be described. Also, a method for selecting reference samples (left and top reference samples) to calculate a DC value using a shift operation instead of a division operation will be described. In one embodiment, as many reference samples as the number of neighboring reference samples on the shorter side of the width and the height of a non-square block are selected from among the neighboring reference samples on the longer side, and a DC value is calculated using the selected neighboring reference samples. As described above, since the total number of reference samples selected is in the form of $2^n$ when as many reference samples as the number of reference samples on the shorter side are selected from among the neighboring reference samples on the longer side, an average value may be calculated using a shift operation.

FIG. 13 illustrates another embodiment of a method for deriving prediction samples in a DC mode. The method disclosed in FIG. 13 selects as many reference samples as the number of reference samples on the shorter side of the width and the height of a non-square block from among the reference samples on the longer side but selects reference samples at different positions on the longer side.

Also, for the sake of convenience, FIG. 13 gives a description using an example in which reference samples closest to a current block (namely, samples located at zero sample distance) are used. In other words, FIG. 13 illustrates reference samples used in a DC mode when a value of reference line index information (for example, intra_luma_ref_idx) is 0. The method disclosed in FIG. 13 may be applied in the same way to a DC mode when a value of the reference line index information (for example, intra_luma_ref_idx) is not 0.

Referring to FIGS. 13(a) to (d), when the current block is a non-square block (for example, an 8×4 block) and the intra prediction of the current block is a DC mode, neighboring reference samples used for intra prediction of the DC mode may be derived. At this time, the neighboring reference samples may include left reference samples (I, J, K, L) located in the left neighborhood of the current block and as many reference samples as the number of the left reference samples from among the top reference samples (A, B, C, D, E, F, G, and H) located in the top neighborhood of the current block.

For example, as shown in FIG. 13(a), as many reference samples as the number of the left reference samples may be selected by sampling the top reference samples (A, B, C, D, E, F, G, and H) at every odd-numbered position. In other words, reference samples at odd-numbered positions may refer to the reference samples (A, C, E, and G) obtained by selecting as many samples as the number of the left reference samples among the top reference samples by sampling every other reference samples starting from the reference sample at the first position. In this case, neighboring reference samples may include a total of 8 reference samples (four left reference samples and four top reference samples). A DC value may be derived by calculating an average of the total of 8 reference samples.

In another example, as shown in FIG. 13(b), as many reference samples as the number of the left reference samples may be selected by sampling the top reference samples (A, B, C, D, E, F, G, and H) at every even-numbered position. In other words, reference samples at even-numbered positions may refer to the reference samples (B, D, F, and H) obtained by selecting as many samples as the number of the left reference samples among the top reference samples by sampling every other reference samples starting from the reference sample at the second position. In this case, neighboring reference samples may include a total of 8 reference samples (four left reference samples and four top reference samples). A DC value may be derived by calculating an average of the total of 8 reference samples.

In yet another example, as shown in FIG. 13(c), as many reference samples as the number of the left reference samples may be selected by sampling the top reference samples (A, B, C, D, E, F, G, and H) at consecutive positions (A, B, C, and D) starting from the first position of the top reference samples. In this case, neighboring reference samples may include a total of 8 reference samples (four left reference samples and four top reference samples). A DC value may be derived by calculating an average of the total of 8 reference samples.

In still another example, as shown in FIG. 13(d), as many reference samples as the number of the left reference samples may be selected by sampling the top reference samples (A, B, C, D, E, F, G, and H) at consecutive positions (E, F, G, H) starting from the last position of the top reference samples. In this case, neighboring reference samples may include a total of 8 reference samples (four left reference samples and four top reference samples). A DC value may be derived by calculating an average of the total of 8 reference samples.

Although the embodiment of FIG. 13 gives a description using an 8×4 block, the description above is only an example, and the methods above may be applied to non-square blocks of various sizes to derive neighboring reference samples and to calculate a DC value using the derived neighboring reference samples. As one example, when the current block is a 16×4 non-square block, four reference samples may be selected among four left reference samples and 16 top reference samples. At this time, when (a) method of FIG. 13 is applied, a total of four top reference samples may be selected by sampling every four samples starting from the reference sample at the first position of the 16 top reference samples. Therefore, a DC value may be derived by calculating an average of four left reference samples and four sampled top reference samples. The operation above may be applied in the same way to the methods illustrated in FIGS. 13(b), (c), and (d) to derive left and top reference samples and to calculate a DC value based on the derived reference samples.

Meanwhile, the intra prediction method using multi-reference lines may be applied only to directional intra prediction modes except for the planar mode and the DC mode. Accordingly, there is a drawback that multi-reference lines may not be applied to intra prediction of the planar mode and the DC mode, which are non-directional modes. The present document proposes a method for performing DC mode intra prediction using multi-reference lines by applying various methods that derive neighboring reference samples in the DC mode as described above.

In one embodiment, to reduce complexity in multi-reference line-based intra prediction, multi-reference lines are not applied to all intra prediction modes but applied only to candidate intra prediction modes included in an MPM list. Accordingly, when MRL-based intra prediction is applied, a DC mode may be added to the MPM list to perform the DC mode. In other words, an existing MPM list for intra prediction using multi-reference lines generates a total of six candidate intra prediction modes that do not include a planar mode and a DC mode. However, according to the present disclosure, an MPM list may be constructed by adding the DC mode to the candidate intra prediction modes. As one example, the DC mode may be added without changing the number of candidate intra prediction modes in the existing MPM list. In this case, a left mode that is a candidate intra prediction mode for a left neighboring block of the current block and a top mode that is a candidate intra prediction mode for a top neighboring block of the current block may be derived, and an MPM list may be constructed by deriving candidate intra prediction modes based on the left and top modes. At this time, one of the candidate intra prediction modes may be derived as a DC mode.

According to one embodiment, in deriving one of the candidate intra prediction modes as a DC mode, one of the candidate intra prediction modes in the MPM list may be removed, and a DC mode may be added. In this case, a method for removing a candidate intra prediction mode in the MPM list may remove a candidate intra prediction mode located on the last order of the MPM list, which has the lowest probability of occurrence. However, the description above is only an example, and a candidate intra prediction mode located at a particular position may be removed, or a candidate intra prediction mode located on the first order of the MPM list may be removed considering the frequency of occurrence of the DC mode. Also, a method for adding a DC mode to the MPM list may add a DC mode to a position in the MPM list, from which the candidate intra prediction mode is removed. For example, a DC mode may be added to the last order of the MPM list or add a DC mode to the first order of the MPM list. Also, the position within the MPM list to which the DC mode is added may be determined arbitrarily. In other words, a candidate intra prediction mode on a particular order among the candidate intra prediction modes in the MPM list may be removed, and the DC mode may be positioned on any order of the MPM list.

As described above, prediction may still be performed using a DC mode in the MRL-based intra prediction by adding a DC mode to the MPM list. At this time, prediction of the DC mode included in the MPM list may use various methods for predicting a DC value described with reference to FIGS. 12 and 13.

Figure 14:
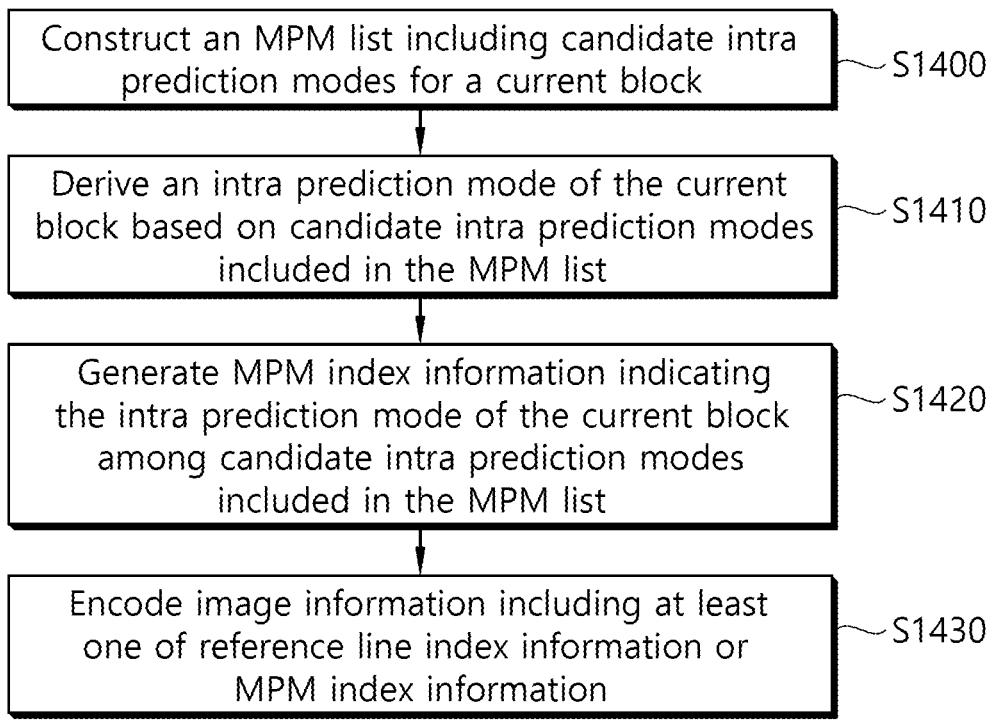
FIG. 14 is a flow diagram illustrating an encoding method that may be performed by an encoding apparatus according to one embodiment of the present disclosure.

FIG. 14 is a flow diagram illustrating an encoding method that may be performed by an encoding apparatus according to one embodiment of the present disclosure.

The method disclosed in FIG. 14 may be performed by the encoding apparatus 200 disclosed in FIG. 2. Specifically, the steps of S1400 to S1420 may be performed by the predictor 220 (more specifically, the intra predictor 222) disclosed in FIG. 2, and the steps of S1420 to S1430 of FIG. 14 may be performed by the entropy encoder 240 disclosed in FIG. 2. Also, the method disclosed in FIG. 14 may include the embodiments described above in the present document. Therefore, detailed descriptions of FIG. 14 overlapping with those of the embodiments above will be omitted or simplified.

Referring to FIG. 14, an encoding apparatus may configure a Most Probable Mode (MPM) list including candidate intra prediction modes for a current block S1400.

In one embodiment, the encoding apparatus may derive a left mode that is a candidate intra prediction mode for a left neighboring block of the current block and may derive a top mode that is a candidate intra prediction mode for a top neighboring block of the current block. Here, the left neighboring block may indicate the bottommost neighboring block among left neighboring blocks located adjacent to the left side of the current block, and the top neighboring block may indicate the rightmost neighboring block located adjacent to the top side of the current block. For example, if the size of the current block is W×H, the x component of the top-left sample position of the current block is $x_N$ and they component thereof is $y_N$, the left neighboring block may be a block including a sample of $(x_{N-1}, y_{N+H-1})$ coordinates, and the top neighboring block may be a block including a sample of $(x_{N+W-1}, y_{N-1})$ coordinates.

For example, when the left neighboring block is available, and intra prediction is applied to the left neighboring block, the encoding apparatus may derive the intra prediction mode of the left neighboring block as a left candidate intra prediction mode (namely, the left mode). When the top neighboring block is available, intra prediction is applied to the top neighboring block, and the top neighboring block is included in a current CTU, the encoding apparatus may derive the intra prediction mode of the top neighboring block as a top candidate intra prediction mode (namely, the top mode). Alternatively, when the left neighboring block is not available, or intra prediction is not applied to the left neighboring block, the encoding apparatus may derive a planar mode as the left mode. The encoding apparatus may derive the planar mode as the top mode when the top neighboring block is not available, intra prediction is not applied to the top neighboring block, or the top neighboring block is not included in the current CTU.

The encoding apparatus may construct an MPM list by deriving candidate intra prediction modes for the current block based on the left mode derived from the left neighboring block and the top mode derived from the top neighboring block. At this time, the MPM list may include the left mode and the top mode and may further include specific intra prediction modes according to a predetermined method.

In one embodiment, the encoding apparatus may determine whether to perform intra prediction by applying multi-reference lines to the current block and may derive a specific intra prediction mode according to the determination and include the derived intra prediction mode in the MPM list. When intra prediction is performed by applying multi-reference lines to the current block, the encoding apparatus may generate and signal reference line index information. The reference line index information may include an index value indicating a reference line used for intra prediction of the current block and may be signaled in the form of the intra_luma_ref_idx syntax element described above. When the value of intra_luma_ref_idx is 0, it may indicate that intra prediction is performed using reference samples first closest to the current block (namely, reference samples at zero sample distance). When the value of intra_luma_ref_idx is 1, it may indicate that intra prediction is performed using reference samples second closest to the current block (namely, reference samples at one sample distance). When the value of intra_luma_ref_idx is 2, it may indicate that intra prediction is performed using reference samples third or fourth closest to the current block (namely, reference samples at two or three sample distances).

For example, when the value of the reference line index information is not 0, the encoding apparatus may derive the DC mode as one of the candidate intra prediction modes and may include the derived DC mode in the MPM list. In this case, the DC mode may be located on any order of the MPM list. Alternatively, the DC mode may be included on the first order or on the last order of the MPM list considering the frequency of occurrences.

The encoding apparatus may derive the intra prediction mode of the current block based on candidate intra prediction modes included in the MPM list S1410.

In one embodiment, the encoding apparatus may perform various intra prediction modes on the current block to derive an intra prediction mode having an optimal Rate-Distortion (RD) cost and determine the derived intra prediction mode as the intra prediction mode of the current block. In this case, the encoding apparatus may derive an optimal intra prediction mode for the current block based on intra prediction modes including two non-directional intra prediction modes and 65 intra directional prediction modes. Alternatively, the encoding apparatus may determine the optimal intra prediction mode using only the MPM candidates comprising the MPM list. Here, the MPM candidates may include candidate intra prediction modes and/or planar mode according to the number of candidates in the MPM list. For example, when the number of candidates in the MPM list is 6, the MPM candidates may include a planar mode and candidate intra prediction modes, and when the number of candidates in the MPM list is 5, the MPM candidates may include candidate intra prediction modes.

For example, when the value of the reference line index information is not 0, the encoding apparatus may derive the optimal intra prediction mode for the current block by using MPM candidate intra prediction modes included in the MPM list. In other words, in this case, the intra prediction mode for the current block may be determined only from among the candidate intra prediction modes (and planar mode) including the DC mode in the MPM list. Also, when the value of the reference line index information is not 0, the encoding apparatus may not encode/signal the MPM flag information. In this way, when the MPM flag information is not encoded/signaled, the value of the MPM flag information may be derived as 1. As described above, the MPM flag information may be expressed in the form of a intra_luma_mpm_flag syntax element. For example, when the value of intra_luma_mpm_flag is 1, it indicates that the intra prediction mode of the current block is selected from among MPM candidate intra prediction modes (candidate intra prediction modes and/or planar mode), and when the value of intra_luma_mpm_flag is 0, it may indicate that the intra-prediction mode of the current block is not selected from among the MPM candidate intra prediction modes (candidate intra-prediction modes and/or planar mode).

The encoding apparatus may generate MPM index information indicating the intra prediction mode of the current block from among the candidate intra prediction modes included in the MPM list S1420.

In one embodiment, when the value of the reference line index information is not 0, and the value of the MPM flag information is derived as 1, the encoding apparatus generates an index value indicating one of the candidate intra prediction modes in the MPM list and encodes the generated index value into MPM index information. In other words, when the value of the reference line index information is not 0, and the value of the MPM flag information is derived as 1, the MPM index information may be encoded/signaled.

For example, when the intra prediction mode of the current block is derived as a DC mode included in the MPM list, the MPM index information may be generated as an index value indicating the DC mode among the candidate intra prediction modes included in the MPM list. At this time, when the DC mode is included on the first order of the MPM list, the MPM index information may be encoded to have an index value of 0. Or, when the DC mode is included on the last order of the MPM list, the MPM index information may be encoded to have an index value of n according to the number of candidates in the MPM list (for example, n is 5 when the number of candidates is 6, or n is 4 when the number of candidates is 5).

Also, the encoding apparatus may generate prediction samples for the current block by performing intra prediction based on an intra prediction mode determined for the current block. For example, when the intra prediction mode of the current block is derived as a DC mode included in the MPM list, the encoding apparatus may derive neighboring reference samples used for the DC mode of the current block based on whether the current block is a square block or a non-square block, calculate a DC value for the current block based on the neighboring reference samples, and generate prediction samples based on the DC value. At this time, the process of deriving neighboring reference samples may be applied to the various embodiments described above, which have been described in detail with reference to FIGS. 12 and 13.

In one embodiment, when the current block is a square block, the encoding apparatus may derive neighboring reference samples including left reference samples of the current block and top reference samples of the current block. At this time, the encoding apparatus may derive neighboring reference samples based on the reference line index information. For example, in this case, the neighboring reference samples may include a left reference line indicated by the reference line index information (namely, left reference samples located at 0, 1, 2, or 3 sample distances) and a top reference line (namely, top reference samples located at 0, 1, 2, or 3 sample distances).

Alternatively, when the current block is a non-square block, and the width of the current block is greater than the height, the encoding apparatus may derive neighboring reference samples including top reference samples of the current block. As one example, the top reference samples may include reference samples, the number of which is the same as the width of the current block. As another example, the top reference samples may include the same number of reference samples as the left reference samples. As yet another example, the top reference samples may include the same number of reference samples as the left reference samples by sampling odd-numbered samples or even-numbered samples among top reference samples of the current block. Also, in this case, the encoding apparatus may derive neighboring reference samples based on reference line index information. For example, in this case, the neighboring reference samples may include a top reference line indicated by the reference line index information (namely, top reference samples located at 0, 1, 2, or 3 sample distances).

Alternatively, when the current block is a non-square block, and the width of the current block is less than the height, the encoding apparatus may derive neighboring reference samples including left reference samples of the current block. As one example, the left reference samples may include reference samples, the number of which is the same as the height of the current block. As another example, the left reference samples may include the same number of reference samples as the top reference samples. As yet another example, the left reference samples may include the same number of reference samples as the top reference samples by sampling odd-numbered samples or even-numbered samples among left reference samples of the current block. Also, in this case, the encoding apparatus may derive neighboring reference samples based on reference line index information. For example, in this case, the neighboring reference samples may include a left reference line indicated by the reference line index information (namely, left reference samples located at 0, 1, 2, or 3 sample distances).

Also, the encoding apparatus may derive residual samples for the current block based on the prediction samples of the current block and the original samples of the current block. In addition, the encoding apparatus may generate residual information on the current block based on the residual samples and encode image information including the residual information. Here, the residual information may include information on the quantized transform coefficients derived by performing transformation and quantization on the residual samples, location information, transform techniques, transform kernels, and quantization parameters.

The encoding apparatus may encode image information including at least one of the reference line index information or the MPM index information S1430.

In one embodiment, the encoding apparatus may encode image information including reference line index information determined based on whether to apply MRL-based intra prediction and intra prediction mode information (for example, MPM index information) of the current block derived based on the MPM list and output the encoded image information in the form of a bitstream. Also, the encoding apparatus may further derive and encode residual information and may output the encoded residual information in the form of a bitstream.

The bitstream may be transmitted to the decoding apparatus through a network or a (digital) storage medium. Here, the network may include a broadcasting network and/or a communication network, and the digital storage medium may include various storage media such as USB, SD, CD, DVD, Bluray, HDD, and SSD.

The process of generating prediction samples for the current block may be performed by the intra predictor 222 of the encoding apparatus 200 disclosed in FIG. 2, the process of deriving residual samples may be performed by the subtractor 231 of the encoding apparatus 200 disclosed in FIG. 2, and the process of generating and encoding residual information may be performed by the residual processor 230 and the entropy encoder 240 of the encoding apparatus 200 disclosed in FIG. 2.

Figure 15:
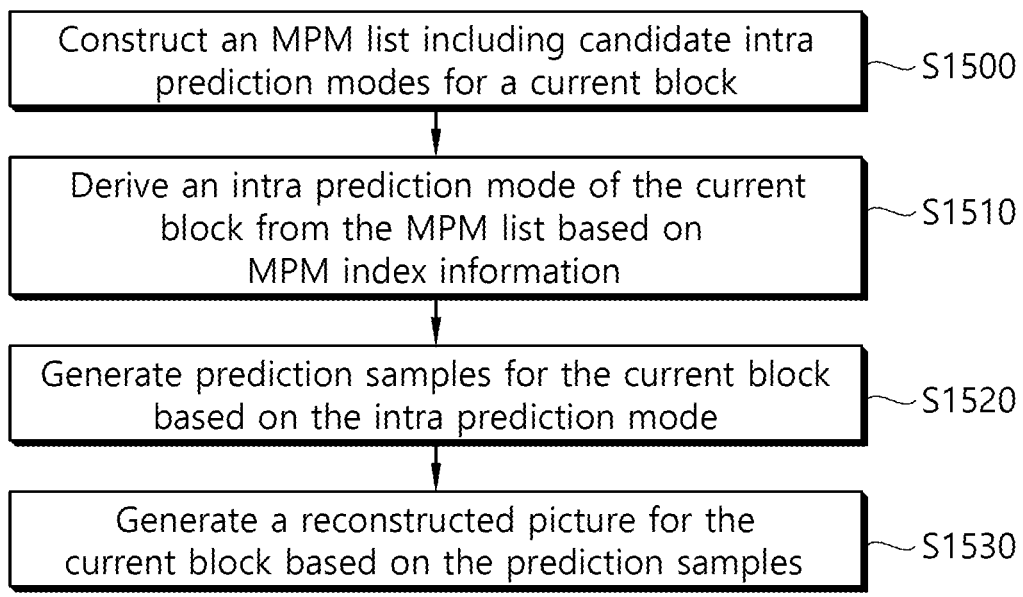
FIG. 15 is a flow diagram illustrating a decoding method that may be performed by a decoding apparatus according to one embodiment of the present disclosure.

FIG. 15 is a flow diagram illustrating a decoding method that may be performed by a decoding apparatus according to one embodiment of the present disclosure.

The method disclosed in FIG. 15 may be performed by the decoding apparatus 300 disclosed in FIG. 3. Specifically, the steps of S1500 to S1520 may be performed by the predictor 330 (more specifically, the intra predictor 331) disclosed in FIG. 3, and the step of S1530 of FIG. 15 may be performed by the residual processor 320 and/or the adder 340 disclosed in FIG. 3. Also, the method disclosed in FIG. 15 may include the embodiments described above in the present document. Therefore, detailed descriptions of FIG. 15 overlapping with those of the embodiments above will be omitted or simplified.

Referring to FIG. 15, the decoding apparatus may configure a Most Probable Mode (MPM) list including candidate intra prediction modes for a current block S1500.

In one embodiment, the decoding apparatus may derive a left mode that is a candidate intra prediction mode for a left neighboring block of the current block and may derive a top mode that is a candidate intra prediction mode for a top neighboring block of the current block. Here, the left neighboring block may indicate the bottommost neighboring block among left neighboring blocks located adjacent to the left side of the current block, and the top neighboring block may indicate the rightmost neighboring block located adjacent to the top side of the current block. For example, if the size of the current block is W×H, the x component of the top-left sample position of the current block is $x_N$ and they component thereof is $y_N$, the left neighboring block may be a block including a sample of $(x_{N-1}, y_{N+H-1})$ coordinates, and the top neighboring block may be a block including a sample of $(x_{N+w-1}, y_{N-1})$ coordinates.

For example, when the left neighboring block is available, and intra prediction is applied to the left neighboring block, the decoding apparatus may derive the intra prediction mode of the left neighboring block as a left candidate intra prediction mode (namely, the left mode). When the top neighboring block is available, intra prediction is applied to the top neighboring block, and the top neighboring block is included in a current CTU, the decoding apparatus may derive the intra prediction mode of the top neighboring block as a top candidate intra prediction mode (namely, the top mode). Alternatively, when the left neighboring block is not available, or intra prediction is not applied to the left neighboring block, the decoding apparatus may derive a planar mode as the left mode. The decoding apparatus may derive the planar mode as the top mode when the top neighboring block is not available, intra prediction is not applied to the top neighboring block, or the top neighboring block is not included in the current CTU.

The decoding apparatus may construct an MPM list by deriving candidate intra prediction modes for the current block based on the left mode derived from the left neighboring block and the top mode derived from the top neighboring block. At this time, the MPM list may include the left mode and the top mode and may further include specific intra prediction modes according to a predetermined method.

In one embodiment, the decoding apparatus may determine whether to perform intra prediction by applying multi-reference lines to the current block and may derive a specific intra prediction mode according to the determination and include the derived intra prediction mode in the MPM list. In other words, the decoding apparatus may determine whether to perform intra prediction by obtaining reference line index information and applying multi-reference lines for the current block. The reference line index information may include an index value indicating a reference line used for intra prediction of the current block and may be signaled in the form of the intra_luma_ref_idx syntax element described above. When the value of intra_luma_ref_idx is 0, it may indicate that intra prediction is performed using reference samples closest to the current block (namely, reference samples at zero sample distance). When the value of intra_luma_ref_idx is 1, it may indicate that intra prediction is performed using reference samples second closest to the current block (namely, reference samples at one sample distance). When the value of intra_luma_ref_idx is 2, it may indicate that intra prediction is performed using reference samples third or fourth closest to the current block (namely, reference samples at two or three sample distances).

For example, when the value of the reference line index information is not 0, the decoding apparatus may derive the DC mode as one of the candidate intra prediction modes and may include the derived DC mode in the MPM list. In this case, the DC mode may be located on any order of the MPM list. Alternatively, the DC mode may be included on the first order or on the last order of the MPM list considering the frequency of occurrences.

The decoding apparatus may derive the intra prediction mode of the current block from the MPM list based on the MPM index information S1510.

In one embodiment, the decoding apparatus may obtain intra prediction mode information for the current block from a bitstream. The intra prediction mode information indicates an intra prediction mode of the current block, including MPM flag information, MPM index information, and remaining mode information.

At this time, when the value of the reference line index information is not 0, the encoding apparatus may not signal the MPM flag information. In this way, when the MPM flag information is not signaled, the decoding apparatus may derive the value of the MPM flag information as 1. As described above, the MPM flag information may be signaled in the form of intra_luma_mpm_flag syntax element. For example, when the value of intra_luma_mpm_flag is 1, it indicates that the intra prediction mode of the current block is selected from among MPM candidate intra prediction modes (candidate intra prediction modes and/or planar mode), and when the value of intra_luma_mpm_flag is 0, it may indicate that the intra-prediction mode of the current block is not selected from among the MPM candidate intra prediction modes (candidate intra-prediction modes and/or planar mode). Here, the MPM candidate intra prediction modes may include candidate intra prediction modes and/or a planar mode depending on the number of candidates of the MPM list. For example, when the number of candidates of the MPM list is 6, the MPM candidates may include a planar mode and candidate intra prediction modes while, when the number of candidates of the MPM list is 5, the MPM candidates may include candidate intra prediction modes.

Also, when the value of the reference line index information is not 0, and the value of the MPM flag information is derived as 1, the MPM index information may be signaled from the encoding apparatus. In other words, the decoding apparatus may obtain the MPM index information from a bitstream and decode the obtained bitstream. As described above, the MPM index information includes an index value indicating an intra prediction mode for the current block among candidate intra prediction modes included in the MPM list, which may be expressed, for example, in the form of intra_luma_mpm_idx syntax element.

In other words, when the value of the reference line index information is not 0, and the value of the MPM flag information is derived as 1, the decoding apparatus may obtain and decode the MPM index information and derive an intra prediction mode of the current block from the MPM list based on the decoded MPM index information.

For example, when the MPM index information indicates a DC mode among candidate intra prediction modes included in the MPM list, the decoding apparatus may derive the intra prediction mode of the current block as the DC mode. At this time, when the DC mode is included on the first order of the MPM list, the MPM index information may be signaled by being encoded to have an index value of 0. Or, when the DC mode is included on the last order of the MPM list, the MPM index information may be signaled by being encoded to have an index value of n according to the number of candidates in the MPM list (for example, n is 5 when the number of candidates is 6, or n is 4 when the number of candidates is 5).

The decoding apparatus may generate prediction samples for the current block based on the intra prediction mode S1520.

For example, when the intra prediction mode of the current block is derived as a DC mode included in the MPM list, the decoding apparatus may derive neighboring reference samples used for the DC mode of the current block based on whether the current block is a square block or a non-square block, calculate a DC value for the current block based on the neighboring reference samples, and generate prediction samples based on the DC value. At this time, the process of deriving neighboring reference samples may be applied to the various embodiments described above, which have been described in detail with reference to FIGS. 12 and 13.

In one embodiment, when the current block is a square block, the decoding apparatus may derive neighboring reference samples including left reference samples of the current block and top reference samples of the current block. At this time, the decoding apparatus may derive neighboring reference samples based on the reference line index information. For example, in this case, the neighboring reference samples may include a left reference line indicated by the reference line index information (namely, left reference samples located at 0, 1, 2, or 3 sample distances) and a top reference line (namely, top reference samples located at 0, 1, 2, or 3 sample distances).

Alternatively, when the current block is a non-square block, and the width of the current block is greater than the height, the decoding apparatus may derive neighboring reference samples including top reference samples of the current block. As one example, the top reference samples may include reference samples, the number of which is the same as the width of the current block. As another example, the top reference samples may include the same number of reference samples as the left reference samples. As yet another example, the top reference samples may include the same number of reference samples as the left reference samples by sampling odd-numbered samples or even-numbered samples among top reference samples of the current block. Also, in this case, the decoding apparatus may derive neighboring reference samples based on reference line index information. For example, in this case, the neighboring reference samples may include a top reference line indicated by the reference line index information (namely, top reference samples located at 0, 1, 2, or 3 sample distances).

Alternatively, when the current block is a non-square block, and the width of the current block is less than the height, the decoding apparatus may derive neighboring reference samples including left reference samples of the current block. As one example, the left reference samples may include reference samples, the number of which is the same as the height of the current block. As another example, the left reference samples may include the same number of reference samples as the top reference samples. As yet another example, the left reference samples may include the same number of reference samples as the top reference samples by sampling odd-numbered samples or even-numbered samples among left reference samples of the current block. Also, in this case, the decoding apparatus may derive neighboring reference samples based on reference line index information. For example, in this case, the neighboring reference samples may include a left reference line indicated by the reference line index information (namely, left reference samples located at 0, 1, 2, or 3 sample distances).

The decoding apparatus may generate a reconstructed picture for the current block based on the prediction samples S1530.

In one embodiment, the decoding apparatus may use the prediction samples directly as reconstructed samples or generate reconstructed samples by adding residual samples to the prediction samples according to a prediction mode.

When there exist residual samples for the current block, the decoding apparatus may receive information on the residuals for the current block. The information on the residuals may include transform coefficients for residual samples. The decoding apparatus may derive residual samples (or residual sample array) for the current block based on the residual information. The decoding apparatus may generate reconstructed samples based on prediction samples and residual samples and derive a reconstructed block or a reconstructed picture based on the reconstructed samples. Afterward, the decoding apparatus may apply the in-loop filtering procedure such as deblocking filtering and/or an SAO procedure to the reconstructed picture depending on the needs to enhance subjective/objective image quality as described above.

In the exemplary system described above, methods are described according to a flow diagram by using a series of steps and blocks. However, the present disclosure is not limited to a specific order of the steps, and some steps may be performed with different steps and in a different order from those described above or simultaneously. Also, it should be understood by those skilled in the art that the steps shown in the flow diagram are not exclusive, other steps may be further included, or one or more steps of the flow diagram may be deleted without influencing the technical scope of the present disclosure.

The method according to the present disclosure may be implemented in the form of software, and the encoding apparatus and/or decoding apparatus according to the present disclosure may be included in an apparatus that performs image processing, such as TV, a computer, a smartphone, a set-top box, and a display apparatus.

When the embodiments of the present disclosure are implemented by software, the aforementioned method may be implemented by a module (process or function) which performs the aforementioned function. The module may be stored in a memory and executed by a processor. The memory may be installed inside or outside the processor and may be connected to the processor via various well-known means. The processor may include Application-Specific Integrated Circuit (ASIC), other chipsets, a logical circuit, and/or a data processing device. The memory may include a Read-Only Memory (ROM), a Random Access Memory (RAM), a flash memory, a memory card, a storage medium, and/or other storage device. In other words, the embodiments according to the present disclosure may be implemented and executed on a processor, a micro-processor, a controller, or a chip. For example, functional units illustrated in the respective figures may be implemented and executed on a computer, a processor, a microprocessor, a controller, or a chip. In this case, information on implementation (for example, information on instructions) or algorithms may be stored in a digital storage medium.

In addition, the decoding apparatus and the encoding apparatus to which the present disclosure is applied may be included in a multimedia broadcasting transceiver, a mobile communication terminal, a home cinema video device, a digital cinema video device, a surveillance camera, a video chat device, and a real time communication device such as video communication, a mobile streaming device, a storage medium, a camcorder, a video on demand (VoD) service provider, an Over The Top (OTT) video device, an internet streaming service provider, a 3D video device, a Virtual Reality (VR) device, an Augment Reality (AR) device, an image telephone video device, a vehicle terminal (for example, a vehicle (including an autonomous vehicle) terminal, an airplane terminal, or a ship terminal), and a medical video device; and may be used to process an image signal or data. For example, the OTT video device may include a game console, a Bluray player, an Internet-connected TV, a home theater system, a smartphone, a tablet PC, and a Digital Video Recorder (DVR).

In addition, the processing method to which the present disclosure is applied may be produced in the form of a program executed by a computer and may be stored in a computer-readable recording medium. Multimedia data having a data structure according to the present disclosure may also be stored in the computer-readable recording medium. The computer readable recording medium includes all kinds of storage devices and distributed storage devices in which computer readable data is stored. The computer-readable recording medium may include, for example, a Bluray disc (BD), a universal serial bus (USB), a ROM, a PROM, an EPROM, an EEPROM, a RAM, a CD-ROM, a magnetic tape, a floppy disk, and an optical data storage device. The computer-readable recording medium also includes media embodied in the form of a carrier wave (for example, transmission over the Internet). In addition, a bitstream generated by the encoding method may be stored in the computer-readable recording medium or transmitted through a wired or wireless communication network.

In addition, the embodiment(s) of the present disclosure may be embodied as a computer program product based on a program code, and the program code may be executed on a computer according to the embodiment(s) of the present disclosure. The program code may be stored on a computer-readable carrier.

Figure 16:
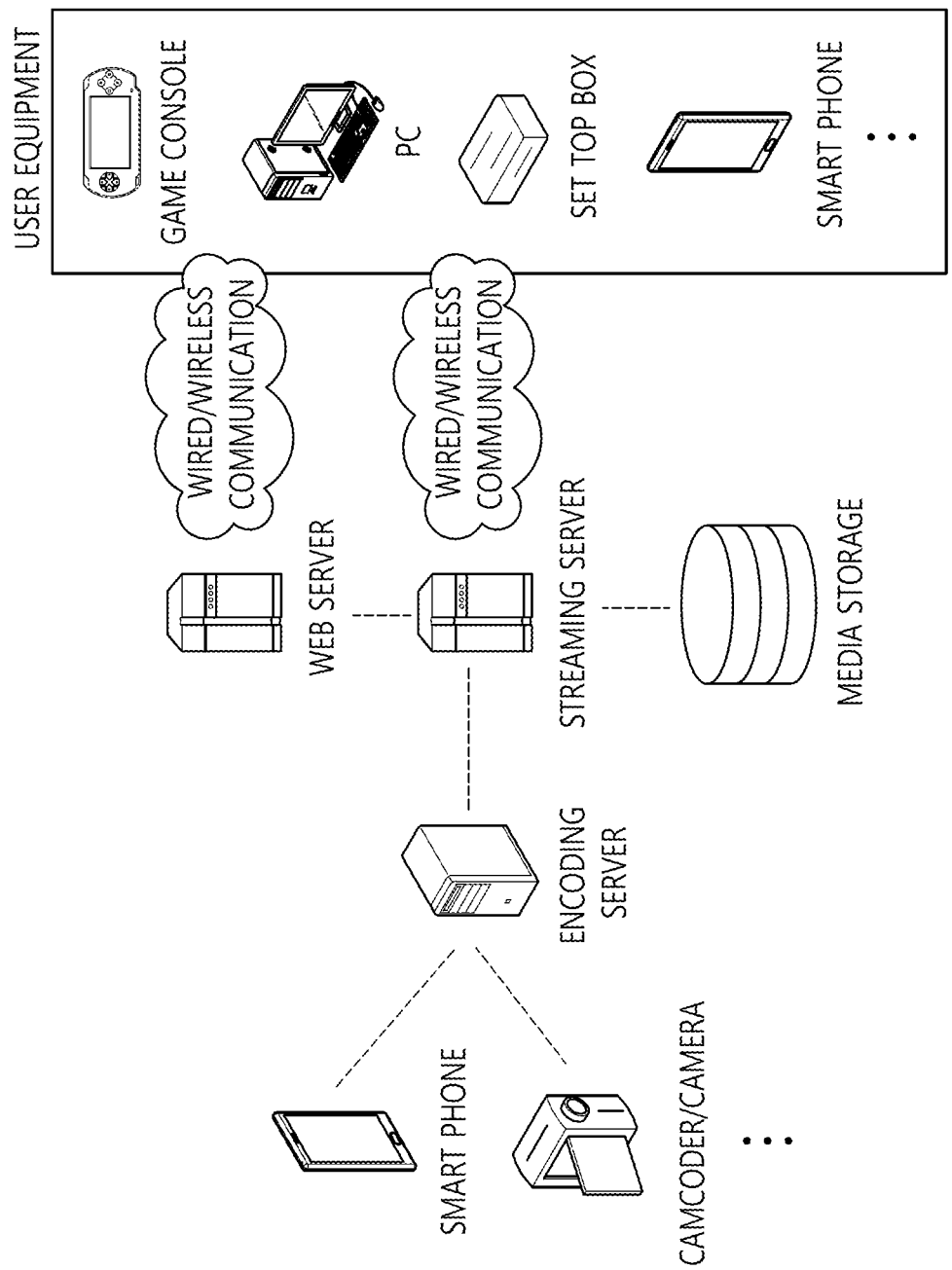
FIG. 16 illustrates an example of a contents streaming system to which embodiments according to the present disclosure may be applied.

FIG. 16 represents an example of a contents streaming system to which the embodiment of the present document may be applied.

Referring to FIG. 16, the content streaming system to which the embodiments of the present document is applied may generally include an encoding server, a streaming server, a web server, a media storage, a user device, and a multimedia input device.

The encoding server functions to compress to digital data the contents input from the multimedia input devices, such as the smart phone, the camera, the camcorder and the like, to generate a bitstream, and to transmit it to the streaming server. As another example, in a case where the multimedia input device, such as, the smart phone, the camera, the camcorder or the like, directly generates a bitstream, the encoding server may be omitted.

The bitstream may be generated by an encoding method or a bitstream generation method to which the embodiments of the present document is applied. And the streaming server may temporarily store the bitstream in a process of transmitting or receiving the bitstream.

The streaming server transmits multimedia data to the user equipment on the basis of a user's request through the web server, which functions as an instrument that informs a user of what service there is. When the user requests a service which the user wants, the web server transfers the request to the streaming server, and the streaming server transmits multimedia data to the user. In this regard, the contents streaming system may include a separate control server, and in this case, the control server functions to control commands/responses between respective equipments in the content streaming system.

The streaming server may receive contents from the media storage and/or the encoding server. For example, in a case the contents are received from the encoding server, the contents may be received in real time. In this case, the streaming server may store the bitstream for a predetermined period of time to provide the streaming service smoothly.

For example, the user equipment may include a mobile phone, a smart phone, a laptop computer, a digital broadcasting terminal, a personal digital assistant (PDA), a portable multimedia player (PMP), a navigation, a slate PC, a tablet PC, an ultrabook, a wearable device (e.g., a watch-type terminal (smart watch), a glass-type terminal (smart glass), a head mounted display (HMD)), a digital TV, a desktop computer, a digital signage or the like.

Each of servers in the contents streaming system may be operated as a distributed server, and in this case, data received by each server may be processed in distributed manner.

What is claimed is:

1. An image decoding method performed by a decoding apparatus, the method comprising:
constructing a Most Probable Mode (MPM) list including candidate intra prediction modes for a current block;
deriving an intra prediction mode of the current block from the MPM list based on MPM index information indicating the intra prediction mode of the current block among the candidate intra prediction modes included in the MPM list;
deriving prediction samples of the current block based on the intra prediction mode; and generating a reconstructed picture based on the prediction samples, wherein the constructing of the MPM list includes deriving a DC mode as one of the candidate intra prediction modes to include the DC mode in the MPM list, based on a case in which a value of reference line index information indicating a reference line used for intra prediction of the current block is not equal to 0, wherein the DC mode is on the first order of the MPM list, wherein the DC mode is derived as the intra prediction mode of the current block based on the MPM index information indicating the DC mode among the candidate intra prediction modes included in the MPM list, wherein a reference line n is used for generating the prediction samples of the current block based on the value of the reference line index information being not equal to 0, wherein the n is greater than 0, and wherein the generating of the prediction samples of the current block comprises:

calculating a DC value for the current block by using specific reference samples among reference samples in the reference line n of the current block, wherein the reference samples include left reference samples and top reference samples in the reference line n of the current block; and deriving the prediction samples based on the DC value, wherein the specific reference samples are determined based on whether the current block is a square block or a non-square block, wherein based on the current block being the square block, the specific reference samples used for calculating the DC value include both the left reference samples in the reference line n and the top reference samples in the reference line n, wherein based on the current block being the non-square block and a width of the current block being greater than a height of the current block, the specific reference samples used for calculating the DC value include the top reference samples in the reference line n and do not include the left reference samples in the reference line n, and wherein based on the current block being the non-square block and the width of the current block being less than the height of the current block, the specific reference samples used for calculating the DC value include the left reference samples in the reference line n and do not include the top reference samples in the reference line n.

2. The method of claim 1, wherein based on the value of the reference line index information being not 0, MPM flag information indicating whether the intra prediction mode of the current block is selected among MPM candidate intra prediction modes is not signaled, and a value of the MPM flag information is derived as 1.

3. The method of claim 2, wherein based on the value of the reference line index information being not 0, and the value of the MPM flag information being derived as 1, the MPM index information is signaled.

4. The method of claim 1, wherein based on the current block being the non-square block and the width of the current block being greater than the height of the current block, a number of the top reference samples used for calculating the DC value is the same as the width of the current block, and wherein based on the current block being the non-square block and the width of the current block being less than the height of the current block, a number of the left reference samples used for calculating the DC value is the same as the height of the current block.

5. The method of claim 1, wherein based on the current block being the non-square block and the width of the current block being greater than the height of the current block, a number of the top reference samples used for calculating the DC value is the same as a number of the left reference samples, and wherein based on the current block being the non-square block and the width of the current block is less than the height of the current block, a number of the left reference samples used for calculating the DC value is the same as a number of the top reference samples.

6. The method of claim 5, wherein based on the current block being the non-square block and the width of the current block being greater than the height of the current block, the top reference samples used for calculating the DC value include odd-numbered samples or even-numbered samples.

7. An image encoding method performed by an encoding apparatus, the method comprising:

constructing a Most Probable Mode (MPM) list including candidate intra prediction modes for a current block;

deriving an intra prediction mode of the current block based on the candidate intra prediction modes included in the MPM list;

generating MPM index information indicating the intra prediction mode of the current block among the candidate intra prediction modes included in the MPM list;

generating prediction samples of the current block based on the intra prediction mode; and encoding image information including at least one of reference line index information indicating a reference line used for intra prediction of the current block or the MPM index information, wherein the constructing the MPM list includes deriving a DC mode as one of the candidate intra prediction modes to include the DC mode in the MPM list, based on a case in which a value of the reference line index information is not equal to 0, wherein the DC mode is on the first order of the MPM list, wherein based on the intra prediction mode of the current block being derived as the DC mode included in the MPM list, the MPM index information is generated as an index value indicating the DC mode among the candidate intra prediction modes included in the MPM list, wherein a reference line n is used for generating the prediction samples of the current block based on the value of the reference line index information being not equal to 0, wherein the n is greater than 0, and wherein the generating of the prediction samples of the current block comprises:

calculating a DC value for the current block by using specific reference samples among reference samples in the reference line n of the current block based on the DC mode being applied to the current block, wherein the reference samples include left reference samples and top reference samples in the reference line n of the current block; and deriving the prediction samples based on the DC value, wherein the specific reference samples are determined based on whether the current block is a square block or a non-square block, wherein based on the current block being the square block, the specific reference samples used for calculating the DC value include both the left reference samples in the reference line n and the top reference samples in the reference line n, wherein based on the current block being the non-square block and a width of the current block being greater than a height of the current block, the specific reference samples used for calculating the DC value include the top reference samples in the reference line n and do not include the left reference samples in the reference line n, and wherein based on the current block being the non-square block and the width of the current block being less than the height of the current block, the specific reference samples used for calculating the DC value include the left reference samples in the reference line n and do not include the top reference samples in the reference line n.

8. The method of claim 7, wherein based on the value of the reference line index information being not 0, MPM flag information indicating whether the intra prediction mode of the current block is selected among MPM candidate intra prediction modes is not signaled, and a value of the MPM flag information is derived as 1.

9. The method of claim 8, wherein, based on the value of the reference line index information being not 0, and the value of the MPM flag information being derived as 1, the MPM index information is signaled.

10. The method of claim 7, wherein based on the current block being the non-square block and the width of the current block being greater than the height of the current block, a number of the top reference samples used for calculating the DC value is the same as the width of the current block, and wherein based on the current block being the non-square block and the width of the current block being less than the height of the current block, a number of the left reference samples used for calculating the DC value is the same as the height of the current block.

11. The method of claim 7, wherein based on the current block being the non-square block and the width of the current block being greater than the height of the current block, a number of the top reference samples used for calculating the DC value is the same as a number of the left reference samples, and wherein based on the current block being the non-square block and the width of the current block is less than the height of the current block, a number of the left reference samples used for calculating the DC value is the same as a number of the top reference samples.

12. A non-transitory computer-readable digital storage medium storing a bitstream generated by a method, the method comprising:

constructing a Most Probable Mode (MPM) list including candidate intra prediction modes for a current block;

deriving an intra prediction mode of the current block based on the candidate intra prediction modes included in the MPM list;

generating MPM index information indicating the intra prediction mode of the current block among the candidate intra prediction modes included in the MPM list;

generating prediction samples of the current block based on the intra prediction mode; and encoding image information including at least one of reference line index information indicating a reference line used for intra prediction of the current block or the MPM index information, wherein the constructing the MPM list includes deriving a DC mode as one of the candidate intra prediction modes to include the DC mode in the MPM list, based on a case in which a value of the reference line index information is not equal to 0, wherein the DC mode is on the first order of the MPM list, wherein based on the intra prediction mode of the current block being derived as the DC mode included in the MPM list, the MPM index information is generated as an index value indicating the DC mode among the candidate intra prediction modes included in the MPM list, wherein a reference line n is used for generating the prediction samples of the current block based on the value of the reference line index information being not equal to 0, wherein the n is greater than 0, and wherein the generating of the prediction samples of the current block comprises:

calculating a DC value for the current block by using specific reference samples among reference samples in the reference line n of the current block based on the DC mode being applied to the current block, wherein the reference samples include left reference samples and top reference samples in the reference line n of the current block; and deriving the prediction samples based on the DC value, wherein the specific reference samples are determined based on whether the current block is a square block or a non-square block, wherein based on the current block being the square block, the specific reference samples used for calculating the DC value include both the left reference samples in the reference line n and the top reference samples in the reference line n, wherein based on the current block being the non-square block and a width of the current block being greater than a height of the current block, the specific reference samples used for calculating the DC value include the top reference samples in the reference line n and do not include the left reference samples in the reference line n, and wherein based on the current block being the non-square block and the width of the current block being less than the height of the current block, the specific reference samples used for calculating the DC value include the left reference samples in the reference line n and do not include the top reference samples in the reference line n.

* * * * *